(12) United States Patent
Suzuki et al.

(10) Patent No.: US 10,063,855 B2
(45) Date of Patent: *Aug. 28, 2018

(54) IMAGE PREDICTIVE ENCODING AND DECODING DEVICE

(71) Applicant: NTT DOCOMO, INC., Chiyoda-ku, Tokyo (JP)

(72) Inventors: Yoshinori Suzuki, Saitama (JP); Choong Seng Boon, Yokohama (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/348,504

(22) Filed: Nov. 10, 2016

(65) Prior Publication Data

US 2017/0099486 A1 Apr. 6, 2017

Related U.S. Application Data

(63) Continuation of application No. 14/581,705, filed on Dec. 23, 2014, now Pat. No. 9,549,186, which is a (Continued)

(30) Foreign Application Priority Data

Mar. 23, 2009 (JP) ................. 2009-069975

(51) Int. Cl.
H04N 19/119 (2014.01)
H04N 19/44 (2014.01)
(Continued)

(52) U.S. Cl.
CPC ......... *H04N 19/119* (2014.11); *H04N 19/105* (2014.11); *H04N 19/44* (2014.11); *H04N 19/46* (2014.11); *H04N 19/176* (2014.11)

(58) Field of Classification Search
CPC .. H04N 19/105; H04N 19/119; H04N 19/176; H04N 19/44; H04N 19/46
See application file for complete search history.

(56) References Cited

U.S. PATENT DOCUMENTS 5,467,086 A 11/1995 Jeong
5,608,458 A 3/1997 Chen et al.
(Continued)

FOREIGN PATENT DOCUMENTS

EP 0 889 653 A2 1/1999
EP 1 621 022 A1 2/2006
(Continued)

OTHER PUBLICATIONS

ISO/IEC, 14496-10, Oct. 1, 2004, ISO, 2nd edition, 280pp.*
(Continued)

Primary Examiner — Peter D Le
(74) Attorney, Agent, or Firm — Brinks Gilson & Lione

(57) ABSTRACT

An image predictive encoding device can efficiently encode an image, while suppressing an increase in prediction information and reducing the prediction error of a target block. In an image predictive encoding device, according to one embodiment, to produce a prediction signal of a partition in a target region, it is decided whether prediction information of a neighboring region can be used. When prediction information of the neighboring region can be used, a region width of the partition where the prediction information of the neighboring region is used to produce the prediction signal is determined. The prediction signal of the target region is produced from a reconstructed signal based on at least one of the region width, the prediction information of the target region, and the prediction information of the (Continued)

neighboring region. The prediction information, information identifying the region width, and a residual signal are encoded.

6 Claims, 21 Drawing Sheets

Related U.S. Application Data continuation of application No. 13/240,559, filed on Sep. 22, 2011, now Pat. No. 9,031,125, which is a continuation of application No. PCT/JP2010/054441, filed on Mar. 16, 2010.

(51) Int. Cl.
*H04N 19/105* (2014.01)
*H04N 19/46* (2014.01)
*H04N 19/176* (2014.01)

(56) References Cited

U.S. PATENT DOCUMENTS

| | | | |
|---|---|---|---|
| 5,682,204 A | 10/1997 | Uz et al. | |
| 6,256,417 B1 | 7/2001 | Takahashi et al. | |
| 6,259,739 B1 | 7/2001 | Kondo | |
| 6,415,056 B1 | 7/2002 | Boon | |
| 6,483,521 B1 | 11/2002 | Takahashi et al. | |
| 6,687,405 B1 | 2/2004 | Trew et al. | |
| 6,765,964 B1 | 7/2004 | Conklin | |
| 7,003,035 B2 | 2/2006 | Tourapis et al. | |
| 7,643,559 B2 | 1/2010 | Kato et al. | |
| 8,155,460 B2 | 4/2012 | Sato et al. | |
| 8,355,438 B2 | 1/2013 | Shimizu et al. | |
| 8,885,727 B2 | 11/2014 | Lee et al. | |
| 9,185,409 B2 | 11/2015 | Suzuki et al. | |
| 9,253,498 B2 | 2/2016 | Lee et al. | |
| 9,497,480 B2 | 11/2016 | Suzuki et al. | |
| 2002/0090030 A1 | 7/2002 | Boon | |
| 2004/0028282 A1 | 2/2004 | Kato et al. | |
| 2004/0109500 A1 | 6/2004 | Book et al. | |
| 2004/0136461 A1* | 7/2004 | Kondo | H04N 19/105 375/240.16 |
| 2004/0179601 A1 | 9/2004 | Kobayashi et al. | |
| 2004/0223548 A1* | 11/2004 | Kato | H04N 19/172 375/240.16 |
| 2004/0252768 A1 | 12/2004 | Suzuki et al. | |
| 2005/0053300 A1 | 3/2005 | Mukerjee | |
| 2005/0163216 A1 | 7/2005 | Boon et al. | |
| 2005/0232500 A1 | 10/2005 | Boon et al. | |
| 2006/0193385 A1 | 8/2006 | Yin et al. | |
| 2007/0009044 A1 | 1/2007 | Tourapis | |
| 2007/0025444 A1 | 2/2007 | Okada et al. | |
| 2007/0065028 A1 | 3/2007 | Boon et al. | |
| 2007/0071105 A1 | 3/2007 | Tian et al. | |
| 2007/0121731 A1 | 5/2007 | Tanizawa et al. | |
| 2007/0253490 A1 | 11/2007 | Makino | |
| 2008/0026729 A1 | 1/2008 | May et al. | |
| 2008/0063071 A1 | 3/2008 | Suzuki | |
| 2008/0063072 A1 | 3/2008 | Suzuki | |
| 2008/0069225 A1 | 3/2008 | Suzuki | |
| 2008/0267292 A1 | 10/2008 | Ito et al. | |
| 2009/0010557 A1 | 1/2009 | Zheng et al. | |
| 2009/0016443 A1 | 1/2009 | Kim et al. | |
| 2009/0034854 A1 | 2/2009 | Lee et al. | |
| 2009/0110070 A1 | 4/2009 | Takahashi et al. | |
| 2011/0261886 A1 | 10/2011 | Suzuki et al. | |
| 2012/0177121 A1 | 7/2012 | Tripathi et al. | |
| 2013/0216148 A1 | 8/2013 | Suzuki et al. | |
| 2013/0301720 A1 | 11/2013 | Lee et al. | |
| 2014/0286395 A1 | 9/2014 | Lee et al. | |
| 2014/0286428 A1 | 9/2014 | Lee et al. | |
| 2014/0286430 A1 | 9/2014 | Lee et al. | |
| 2016/0021389 A1 | 1/2016 | Suzuki et al. | |

FOREIGN PATENT DOCUMENTS

| | | |
|---|---|---|
| EP | 1 684 524 A1 | 7/2006 |
| JP | 7-264598 A | 10/1995 |
| JP | 2005-277968 A | 10/2005 |
| JP | 2008-311781 A | 12/2008 |
| JP | 2009-5147 A | 1/2009 |
| JP | 2009-246972 A | 10/2009 |
| JP | 2013-530658 A | 7/2013 |
| JP | 5712330 B2 | 5/2015 |
| WO | WO 03/026315 A1 | 3/2003 |
| WO | WO 2004/091222 A1 | 10/2004 |
| WO | WO 2008/016609 A2 | 2/2008 |
| WO | WO 2008/117158 | 10/2008 |
| WO | WO 2008/127597 | 10/2008 |
| WO | WO 2010/064396 A1 | 6/2010 |
| WO | WO 2010/110126 A1 | 9/2010 |
| WO | WO 2012/005520 | 1/2012 |
| WO | WO 2012/011432 A1 | 1/2012 |

OTHER PUBLICATIONS

Office Action in Canadian Application Serial No. 2,903,530, dated Nov. 4, 2016, 5 pages.
Office Action in Canadian Application No. 2,921,802, dated Jan. 20, 2017, 4 pages.
Office Action in corresponding Australian Application No. 2016201339, dated Mar. 1, 2017, 6 pages.
Office Action, and English language translation thereof, in European Application No. 16167025.2, dated Jun. 1, 2017, 8 pages.
Office Action in European Application No. 11809603.1, dated Jul. 20, 2017, 4 pages.
Office Action, and English language translation thereof, in Japanese Application No. 2016-084633, dated Apr. 25, 2017, 6 pages.
Ismaeil et al., "Efficient Motion Estimation Using Spatial and Temporal Motion Vector Prediction", *1999 International Conference on Kobe-Japan*, IEEE, Piscataway, NJ, USA, vol. 1, Oct. 1999, pp. 70-74.
Extended European Search Report in corresponding European Application No. 17179305.2, dated Oct. 9, 2017, 12 pages.
Office Action in Australian Application No. 2016231582, dated Sep. 11, 2017, 5 pages.
McCann, Ken et al., "Samsung's Response to the Call for Proposals on Video Compression Technology," Joint Collaborative Team on Video Coding (JCT-VC) of ITU-T SG16 WP3 and ISO/IEC JTC1/SC29/WG11, 1st Meeting: Dresden, Germany, Apr. 15-23, 2010, Document: JCTVC-A124, Samsung Electronics Co., Ltd. and British Broadcasting Corporation, 42 pages.
JCT-VC, "Test Model under Consideration," Joint Collaborative Team on Video Coding (JCT-VC) of ITU-T SG16 WP3 and ISO/IEC JTC1/SC29/WG11, 1st Meeting: Dresden, Germany, Apr. 15-23, 2010, Document: JCTVC-A205, Output Document (draft007), JCT-VC, 153 pages.
Winken, Martin et al., "Description of video coding technology proposal by Fraunhofer HHI," Joint Collaborative Team on Video Coding (JCT-VC) of ITU-T SG16 WP3 and ISO/IEC JTC1/SC29/WG11, 1st Meeting: Dresden, Germany, Apr. 15-23, 2010, Document: JCTVC-A116, Input Document to JCT-VC, Fraunhofer HHI, 44 pages.
International Search Report, and English language translation thereof, in International Application No. PCT/JP2011/066120, dated Oct. 18, 2011, 4 pages.
U.S. Office Action, dated Dec. 26, 2017, pp. 1-4, issued in corresponding U.S. Appl. No. 15/706,424, U.S. Patent and Trademark Office, Alexandria, VA.
Office Action, and English language translation thereof, in corresponding Korean Application No. 10-2017-7036233, dated Mar. 7, 2018, 11 pages.
"ITU-T Recommendation H.264-Advanced Video Coding for Generic Audovisual Services", *International Telecommunication Union*, Mar. 2005, 343 pages.
Office Action, and English language translation thereof, in corresponding Indian Application No. 7174/DELNP/2011, dated Feb. 5, 2018, 6 pages.

(56) References Cited

OTHER PUBLICATIONS

Extended European Search Report in corresponding European Application No. 10755924.7, dated Jun. 18, 2013, 9 pages.
International Preliminary Report on Patentability in corresponding International Application No. PCT/JP2010/054441, dated Oct. 18, 2011, 4 pages.
International Search Report, and English language translation thereof, in corresponding International Application No. PCT/JP2010/054441, dated Jun. 15, 2010, 12 pages.
Tran, Trac D., "Video Coding", *ECE Department, The Johns Hopkins University*, Baltimore, MD, 2006, pp. 1-121 (in two documents—'A' and 'B').
Notice of Reasons for Rejection, and English language translation thereof, in corresponding Japanese Application No. 2014-147639, dated Feb. 17, 2015, 9 pages.
Subsequent Substantive Examination Report in corresponding Philippines Application No. 1/2013/500087, dated Apr. 8, 2015, 2 pages.
Patent Examination Report No. 1 in corresponding Australian Application No. 2010228415, dated Jul. 17, 2015, 6 pages.
Extended Search Report in corresponding European Application No. 15185593.9 dated Jan. 21, 2016, 11 pages.
Extended Search Report in corresponding European Application No. 11809603.1 dated Feb. 5, 2016, 9 pages.
De Forni, R et al., "On the Benefits of Leaf Merging in Quad-Tree Motion Models", *Image Processing, 2005.Icip 2005. IEEE International Conference on, IEEE*. Piscataway, NJ, USA, IEEE, vol. 2, Sep. 11, 2005, pp. 858-861.
Winken (Fraunhofer), M. et al, "Video Coding Technology Proposal by Fraunhofer HHI", *1.JCT-VC Meeting; Apr. 15, 2010-Apr. 23, 2010; Dresden*; (*Joint Collaborative Team on Video Coding of ISO/IEC JTC1/SC29/WG11 and ITU-STG.16*);URL: HTTP://WFTP3.ITU.INT/AV-ARCH/JCTVC-A116, Apr. 24, 2010, pp. 1-44.
Office Action, and English translation thereof, in corresponding Mexican Application No. MX/a/2015/006350, dated Feb. 16, 2016, 12 pages.
Office Action, and English language translation thereof, in corresponding Japanese Application No. 2015-045725, dated Mar. 8, 2016, 6 pages.
Office Action and English language translation thereof, in corresponding Taiwanese Application No. 104133686, dated May 10, 2016, 9 pages.
Extended Search Report in corresponding European Application No. 16167025.2, dated Aug. 9, 2016, 8 pages.
Office Action in corresponding U.S. Appl. No. 14/581,705, dated Nov. 17, 2015, 11 pages.
Office Action in corresponding U.S. Appl. No. 14/581,705, dated May 6, 2016, 11 pages.
Notice of Allowance in corresponding U.S. Appl. No. 14/581,705, dated Nov. 3, 2016, 13 pages.
Office Action in European Application No. 11809603.1 dated Jun. 19, 2018, pp. 1-6.

* cited by examiner

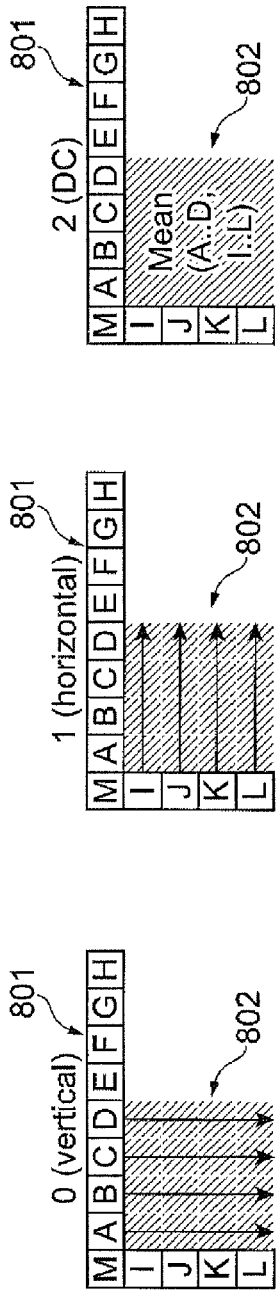
Fig. 20A  0 (vertical)
Fig. 20B  1 (horizontal)
Fig. 20C  2 (DC) Mean (A..D, I..L)
Fig. 20D  3 (diagonal down-left)
Fig. 20E  4 (diagonal down-right)
Fig. 20F  5 (vertical-right)
Fig. 20G  6 (horizontal-down)
Fig. 20H  7 (vertical-left)
Fig. 20I  8 (horizontal-up)

IMAGE PREDICTIVE ENCODING AND DECODING DEVICE

RELATED APPLICATIONS

This application is a continuation of U.S. application Ser. No. 14/581,705 filed on Dec. 23, 2014, which is a continuation of U.S. application Ser. No. 13/240,559 filed on Sep. 22, 2011, which is a continuation of PCT/JP2010/054441, filed Mar. 16, 2010, which claims the benefit of the filing date under 35 U.S.C. § 119(e) of JP2009-069975, filed Mar. 23, 2009, all of which are incorporated herein by reference.

TECHNICAL FIELD

The present invention relates to an image predictive encoding/decoding system. More particularly, the present invention relates to an image predictive encoding device, an image predictive encoding method, an image predictive encoding program, an image predictive decoding device, an image predictive decoding method, and an image predictive decoding program that perform predictive encoding and predictive decoding by using region division.

BACKGROUND ART

Compression encoding technology is used in order to efficiently transmit and store still image data and moving image data. The MPEG-1 to 4 and ITU (International Telecommunication Union) H.261 to H.264 systems are widely used for a compression encoding system for moving pictures.

SUMMARY OF INVENTION

An image prediction encoding/decoding system may produce a production signal for each block unit. However, since the location and movement of a moving object may be arbitrarily set in a video, when the picture is divided into blocks at equal intervals, there are cases that two or more regions with different movements and patterns may be included in the block. In such a case, the prediction encoding of the moving image may cause a large prediction error near the edge of the moving object.

In order to accommodate local feature changes in images and suppress an increase in prediction error, a plurality of prediction types with different block sizes may be prepared. As the block size becomes smaller, however, additional information to produce the prediction signal (motion vector etc.) may be needed for each small block, resulting in an increase in code amount of the additional information. In addition, when many block sizes are prepared, mode information to select the block size may be needed, also resulting in an increase in code amount of the mode information.

One aspect of the present embodiments of the image prediction encoding/decoding system may include an image predictive encoding device, an image predictive encoding method, and an image predictive encoding program that can efficiently encode an image, while suppressing an increase in prediction information, such as additional information (motion vectors etc.) and mode information, and reducing the prediction error of the target block. Additionally, another aspect of the present embodiments aims to provide an image predictive decoding device, an image predictive decoding method, and an image predictive decoding program that correspond to such encoding aspect.

One aspect of the image prediction encoding/decoding system relates to encoding an image. An image predictive encoding device according to one embodiment may include: (a) a region division unit for dividing an input image into a plurality of regions; (b) a prediction information estimation unit for producing a prediction signal of a target region among the plurality of regions from a reconstructed signal and obtaining prediction information that is used to produce the prediction signal, as prediction information associated with the target region; (c) a prediction information encoding unit for encoding the prediction information associated with the target region; (d) a decision unit for making a comparison of the prediction information associated with the target region and prediction information associated with a neighbouring region located adjacent to the target region and deciding, based on a result of the comparison, whether the prediction information associated with the neighbouring region can be used to produce the prediction signal of the target region; (e) a region width determination unit for, when it is decided by the decision unit that the prediction information associated with the neighbouring region can be used to produce the prediction signal of the target region, determining a region width of a partition that is included in the target region and where the prediction information associated with the neighbouring region is used to produce the prediction signal; (f) a region width encoding unit for encoding information identifying the region width associated with the target region; (g) a prediction signal production unit for producing the prediction signal of the target region from the reconstructed signal by using at least one of the prediction information associated with the target region, the prediction information associated with the neighbouring region, and the region width; (h) a residual signal production unit for producing a residual signal between the prediction signal of the target region and the original signal of the target region; (i) a residual signal encoding unit for encoding the residual signal; (j) a residual signal restoration unit for producing a decoded residual signal by decoding encoded data of the residual signal; (k) an adding unit for producing a reconstructed signal of the target region by adding the prediction signal to the decoded residual signal; and (l) a storage unit for storing the reconstructed signal of the target region.

In addition, an image predictive encoding method according to one embodiment includes: (a) a region division step for dividing an input image into a plurality of regions; (b) a prediction information estimation step for producing a prediction signal of a target region among the plurality of regions from a reconstructed signal and obtaining prediction information that is used to produce the prediction signal, as prediction information associated with the target region; (c) a prediction information encoding step for encoding the prediction information associated with the target region; (d) a decision step for making a comparison of the prediction information associated with the target region and prediction information associated with an neighbouring region located adjacent to the target region and deciding, based on a result of the comparison, whether the prediction information associated with the neighbouring region can be used to produce the prediction signal of the target region; (e) a region width determination step for, when it is decided in the decision step that the prediction information associated with the neighbouring region can be used to produce the prediction signal of the target region, determining a region width of a partition that is included in the target region and where the prediction information associated with the neighbouring region is used to produce the prediction signal; (f) a region width encoding step for encoding information identifying the region width; (g) a prediction signal production step for producing the prediction signal of the target region from the reconstructed signal by using at least one of the prediction information associated with the target region, the prediction information associated with the neighbouring region, and the region width; (h) a residual signal production step for producing a residual signal indicative of a difference between the prediction signal of the target region and the original signal of the target region; (i) a residual signal encoding step for encoding the residual signal; (j) a residual signal restoration step for producing a decoded residual signal by decoding encoded data of the residual signal; (k) a reproduced signal production step for producing a reconstructed signal of the target region by adding the prediction signal to the decoded residual signal; and (l) a storage step for storing the reconstructed signal of the target region.

Furthermore, an image predictive encoding program according to one embodiment causes a computer to function as: (a) a region division unit for dividing an input image into a plurality of regions; (b) a prediction information estimation unit for producing a prediction signal of a target region among the plurality of regions from a reconstructed signal and obtaining prediction information that is used to produce the prediction signal, as prediction information associated with the target region; (c) a prediction information encoding unit for encoding the prediction information associated with the target region; (d) a decision unit for making a comparison of the prediction information associated with the target region and prediction information associated with a neighbouring region located adjacent to the target region and deciding, based on a result of the comparison, whether the prediction information associated with the neighbouring region can be used to produce the prediction signal of the target region; (e) a region width determination unit for, when it is decided by the decision unit that the prediction information associated with the neighbouring region can be used to produce the prediction signal of the target region, determining a region width of a partition that is included in the target region and where the prediction information associated with the neighbouring region is used to produce the prediction signal; (f) a region width encoding unit for encoding information identifying the region width; (g) a prediction signal production unit for producing the prediction signal of the target region from the reconstructed signal by using at least one of the prediction information associated with the target region, the prediction information associated with the neighbouring region, and the region width; (h) a residual signal production unit for producing a residual signal indicative of a difference between the prediction signal of the target region and the original signal of the target region; (i) a residual signal encoding unit for encoding the residual signal; (j) a residual signal restoration unit for producing a decoded residual signal by decoding encoded data of the residual signal; (k) an adding unit for producing a reconstructed signal of the target region by adding the prediction signal to the decoded residual signal; and (l) a storage unit for storing the reconstructed signal of the target region.

According to an encoding aspect of the image predictive encoding/decoding system, when the prediction information of the neighbouring region can be used, the prediction signal of the partition in the target region may be produced by using the prediction information of the neighbouring region. Therefore, prediction error of the target region where an edge of an image exists can be reduced. In addition, since prediction information of the neighbouring region may be used to produce the prediction signal of the partition in the target region, it is possible to suppress an increase in an amount of prediction information.

In one embodiment, when it is decided that the prediction information associated with the target region and the prediction information associated with the neighbouring region are the same, similar, substantially similar, matching, or identical, it may be decided that the prediction information associated with the neighbouring region is not used to produce the prediction signal of the target region. This is because when the prediction information associated with the target region and the prediction information associated with the neighbouring region are the same, a reduction in the prediction error of the target region is not achieved.

In one embodiment, when it is decided that a combination of the prediction information associated with the target region and the prediction information associated with the neighbouring region fails to satisfy a predetermined condition, it may be decided that the prediction information associated with the neighbouring region is not used to produce the prediction signal of the target region.

In an encoding aspect of the image predictive encoding/decoding system, when it is decided that the prediction information associated with the neighbouring region is not used to produce the prediction signal of the target region, encoded data of the region width associated with the target region may not be output. The code amount is thereby reduced.

In one embodiment, the neighbouring region may be at least two neighbouring regions. The at least two neighbouring regions may be adjacent or contiguous to the same side, or different sides of the target region, such as a first side and a second side of the target region, where a side may constitute a surface, a perimeter, border, or any other boundary or periphery of the target region. For example, one of the at least two neighbouring regions may be on the left side of the target region, and a second of the two neighbouring regions may be on another side, such as the top of the target region. In such a case, when it is decided that prediction information associated with both of the at least two neighbouring regions can be used to produce the prediction signal of the target region, identification information that identifies an neighbouring region having the prediction information to be used to produce the prediction signal of the target region from the at least two neighbouring regions, can be encoded. According to such a feature, it is possible to produce the prediction signal of the partition from an optimal neighbouring region out of the at least two neighbouring regions, thereby further reductions in the prediction error may be achieved.

Another aspect of the image predictive encoding/decoding system relates to decoding of an image. An image predictive decoding device according to one embodiment includes: (a) data analysis means for extracting, from compressed data which has been produced by dividing an image into a plurality of regions and encoding the regions, encoded data of prediction information that has been used to produce a prediction signal of a target region, encoded data of information identifying a region width of a partition in the target region where prediction information associated with an neighbouring region located adjacent to the target region has been used to produce the prediction signal, and encoded data of a residual signal; (b) prediction information decoding means for restoring the prediction information associated with the target region by decoding the encoded data of the prediction information; (c) decision means for making a comparison of the prediction information associated with the target region and the prediction information associated with the neighbouring region, and deciding, based on a result of the comparison, whether the prediction information associated with the neighbouring region can be used to produce the prediction signal of the target region; (d) region width decoding means for, when it is decided by the decision means that the prediction information associated with the neighbouring region can be used to produce the prediction signal of the target region, restoring the region width by decoding the encoded data of the information identifying the region width; (e) prediction signal production means for producing the prediction signal of the target region from a reconstructed signal by using at least one of the prediction information associated with the target region, the prediction information associated with the neighbouring region, and the region width; (f) residual signal restoration means for restoring a decoded residual signal of the target region from the encoded data of the residual signal; (g) adding means for producing a reconstructed signal of the target region by adding the prediction signal of the target region to the decoded residual signal; and (h) storage means for storing the reconstructed signal of the target region.

In addition, an image predictive decoding method according to one embodiment includes: (a) a data analysis step for extracting, from compressed data which has been generated by dividing an image into a plurality of regions and encoding the regions, encoded data of prediction information that has been used to produce a prediction signal of a target region, encoded data of information identifying a region width of a partition in the target region where prediction information associated with an neighbouring region located adjacent to the target region has been used to produce the prediction signal, and encoded data of a residual signal; (b) a prediction information decoding step for restoring the prediction information associated with the target region by decoding the encoded data of the prediction information; (c) a decision step for making a comparison of the prediction information associated with the target region and the prediction information associated with the neighbouring region, and deciding, based on a result of the comparison, whether the prediction information associated with the neighbouring region can be used to produce the prediction signal of the target region; (d) a region width decoding step for, when it is decided in the decision step that the prediction information associated with the neighbouring region can be used to produce the prediction signal of the target region, restoring the region width by decoding the encoded data of the information identifying the region width; (e) a prediction signal production step for producing the prediction signal of the target region from a reconstructed signal by using at least one of the prediction information associated with the target region, the prediction information associated with the neighbouring region, and the region width; (f) a residual signal restoration step for restoring a decoded residual signal of the target region from the encoded data of the residual signal; (g) a reconstructed signal production step for producing a reconstructed signal of the target region by adding the prediction signal of the target region to the decoded residual signal; and (h) a storage step for storing the reconstructed signal of the target region.

Furthermore, an image predictive decoding program according to one embodiment causes a computer to function as: (a) data analysis means for extracting, from compressed data which has been produced by dividing an image into a plurality of regions and encoding the regions, encoded data of prediction information that has been used to produce a prediction signal of a target region; encoded data of information identifying a region width of a partition in the target region where prediction information associated with a neighbouring region located adjacent to the target region has been used to produce the prediction signal; and encoded data of a residual signal; (b) prediction information decoding means for restoring the prediction information associated with the target region by decoding the encoded data of the prediction information; (c) decision means for making a comparison of the prediction information associated with the target region and the prediction information associated with the neighbouring region and deciding, based on a result of the comparison, whether the prediction information associated with the neighbouring region can be used to produce the prediction signal of the target region; (d) region width decoding means for, when it is decided by the decision means that the prediction information associated with the neighbouring region can be used to produce the prediction signal of the target region, restoring the region width by decoding the encoded data of the information identifying the region width; (e) prediction signal production means for producing the prediction signal of the target region from a reconstructed signal by using at least one of the prediction information associated with the target region, the prediction information associated with the neighbouring region, and the region width; (f) residual signal restoration means for restoring a decoded residual signal of the target region from the encoded data of the residual signal; (g) adding means for producing a reconstructed signal of the target region by adding the prediction signal of the target region to the decoded residual signal; and (h) storage means for storing the reconstructed signal of the target region as the reconstructed signal. The image predictive encoding/decoding system according to such decoding enables the system to preferably reproduce an image from the compressed data produced by encoding such as described above.

In one embodiment, when it is decided that the prediction information associated with the target region and the prediction information associated with the neighbouring region match, or are the same, or are substantially similar, it may be decided that the prediction information associated with the neighbouring region fails to be used to produce the prediction signal of the target region. In addition, when it is decided that a combination of the prediction information associated with the target region and the prediction information associated with the neighbouring region fails to satisfy a predetermined condition, it may be decided that the prediction information associated with the neighbouring region will not be used to produce the prediction signal of the target region.

In one embodiment, when it is decided that the prediction information associated with the neighbouring region fails is not used to produce the prediction signal of the target region, the region width associated with the target region may be set to a predetermined value, such as zero.

In one embodiment, the neighbouring region may be two or more neighbouring regions. The two or more neighbouring regions may be adjacent one or more sides of target region, for example, a first of the two or more neighbouring regions may be on the left of the target region, and a second of the two or more neighbouring regions may be on top of the target region. The sides of the target region may constitute a surface, a perimeter, border, or any other boundary or periphery of the target region. In such case, when it is decided that both prediction information associated with the two or more neighbouring regions can be used to produce the prediction signal of the target region, the region width decoding means can decode identification information that identifies an neighbouring region having the prediction information to be used to produce the prediction signal of the target region from the two or more neighbouring regions.

The image predictive encoding/decoding system may include an image predictive encoding device, an image predictive encoding method and an image predictive encoding program that can efficiently encode an image by suppressing an increase in prediction information and reducing prediction error of a target block. In addition, the image predictive encoding/decoding system may include an image predictive decoding device, an image predictive decoding method and an image predictive decoding program.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

FIGS. 20A through 20I are schematic views describing an example of an intra-picture prediction method.

DETAILED DESCRIPTION OF THE PREFERRED EMBODIMENTS

Figure 1:
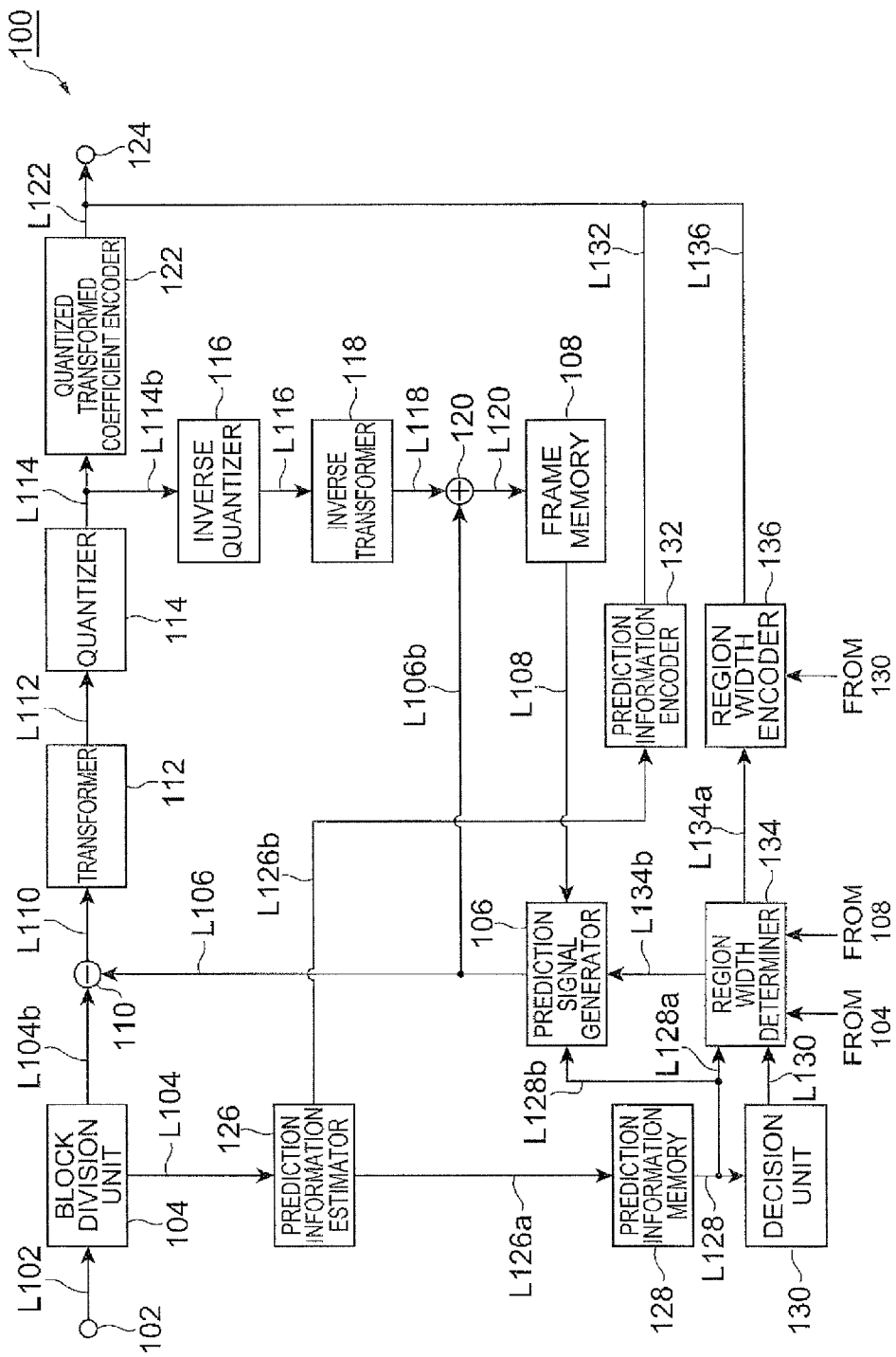
FIG. 1 is a diagram showing an example of an image predictive encoding device according to one embodiment.

Example embodiments of the image predictive encoding/decoding system are described in detail below with reference to the drawings. In each drawing, parts that are the same or equivalent are labeled with the same reference numerals.

In image predictive encoding/decoding system, encoding processing and decoding processing are performed after dividing an image serving as an encoding target into a plurality of blocks. In intra-picture prediction encoding, a prediction signal of a target block is produced by using an adjacent reconstructed image signal within the same picture where the target block is included. The reconstructed image signal is generated by restoring compressed image data. Next, in the intra-picture prediction encoding, a differential signal is generated by subtracting the prediction signal from a signal of the target block, and the differential signal is encoded. In inter-picture prediction encoding, referring to the reconstructed image signal within a different picture from the picture where the target block is included, motion compensation is performed, and a prediction signal is thereby produced. Next, in the inter-picture prediction encoding, the prediction signal is subtracted from the signal of the target block so as to produce a differential signal, and the differential signal is encoded.

For example, intra-picture prediction encoding may include a method in which the prediction signal is produced by extrapolating, in a predetermined direction, reconstructed pixel values (reconstructed signals) of pixels located neighbouring, or adjacent to a block serving as an encoding target. FIG. 20 is a schematic view describing an example of the intra-picture prediction method. FIG. 20A shows the intra-picture prediction method in which extrapolation is performed in a vertical direction. In FIG. 20A, a 4×4 pixel target block 802 is the example target block serving as an encoding target. A pixel group 801 composed of pixels A to M located neighbouring, or adjacent to a boundary of the target block 802 is a neighbouring region, and is an image signal that has been reconstructed in the past process. In prediction shown in FIG. 20A, pixel values of the adjacent pixels A to D located directly above the target block 802 are extrapolated downwards so as to produce a prediction signal.

FIG. 20B shows an intra-picture prediction method in which extrapolation is performed in a horizontal direction. In the prediction shown in FIG. 20B, a prediction signal is produced by extrapolating pixel values of reconstructed pixels I to L located on the left of the target block 802 rightward.

In the intra-picture prediction method, the prediction signal having the lowest difference from the original signal of the target block may be taken to be the optimal prediction signal, from among the nine prediction signals produced by the methods shown in A-I of FIG. 20.

In inter-picture prediction encoding, a prediction signal is produced by searching for a signal resembling the original signal of the block serving as the encoding target, from reconstructed pictures. In the inter-picture prediction encoding, a motion vector and a residual signal between the original signal and the prediction signal of the target block are encoded. The motion vector is a vector indicating a spatial displacement amount between the target block and a region where the searched signal is located. The technique of searching for the motion vector for each block, in this way, may be described as block matching.

Figure 21B:
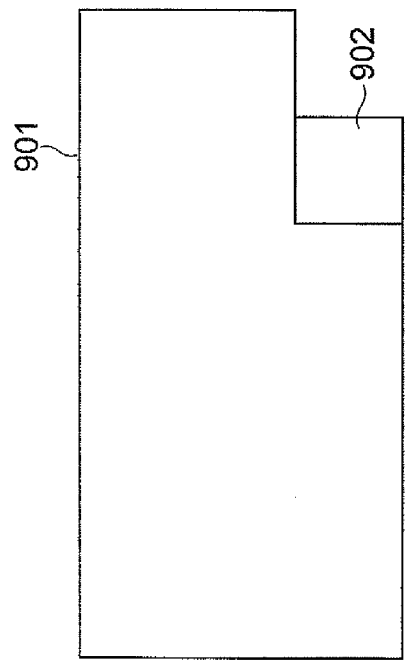
FIGS. 21A and 21B are schematic views describing an example of block matching.
Figure 21A:
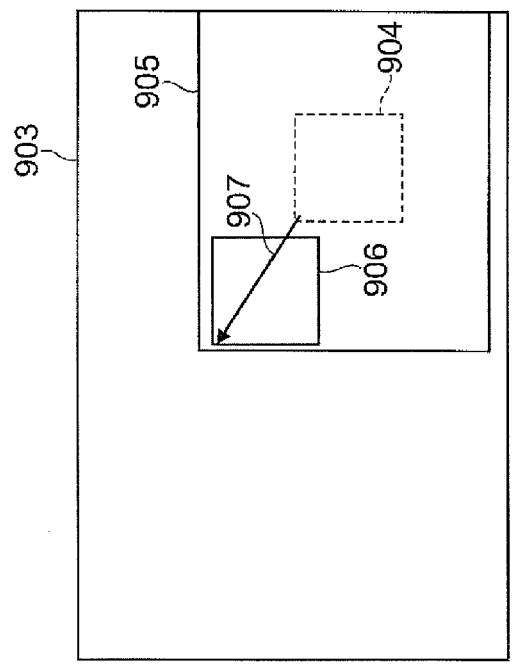

FIG. 21 is a schematic view describing an example of block matching. In FIG. 21, a reconstructed picture 903 is shown in FIG. 21A and a picture 901 including a target block 902 is shown in FIG. 21B. Here, a region 904 in the picture 903 is a region that is in the same spatial position as the target block 902. In block matching, a search range 905 surrounding the region 904 is set, and a region 906 that has the lowest sum of absolute differences with respect to the original signal of the target block 902 is detected from the search range. The signal of the region 906 becomes a prediction signal, and a vector indicating the displacement amount from the region 904 to the region 906 is detected as a motion vector 907.

In block matching, there may also be a method in which a plurality of reference pictures 903 are prepared, and the reference picture for performing the block matching is selected for each target block, and reference picture selection information is detected. In order to accommodate local feature changes in images, a plurality of prediction types with different block sizes for encoding the motion vector may be prepared.

In compression encoding of moving image data, each picture (frame or field) can be encoded in any sequence. Therefore, there are a number of approaches, such as three, for an encoding order in the inter-picture prediction that produces a prediction signal with reference to reconstructed pictures. For example, a first approach is a forward prediction that produces a prediction signal with reference to reconstructed pictures in the past in a reproduction order. A second approach is a backward prediction that produces a prediction signal with reference to reconstructed pictures in the future in a display order. A third approach is a bidirectional prediction that performs both forward prediction and backward prediction so as to average the two prediction signals.

FIG. 1 is a diagram showing an example image predictive encoding device according to one embodiment of the image predictive encoding/decoding system. An image predictive encoding device 100 shown in FIG. 1 includes a plurality of modules, units and/or components. The picture predicting encoding device 100 may be a computing device or computer, including for example software, hardware, or a combination of hardware and software, as described later, capable of performing the described functionality. The image prediction encoding device 100 may be one or more separate systems or devices, may be one or more systems or devices included in the image encoding/decoding system, or may be combined with other systems or devices within the image predictive encoding/decoding system. In other examples, fewer or additional blocks may be used to illustrate the functionality of the image prediction encoding device 100. The modules, units and/or components include an input terminal 102, a block division unit 104, a prediction signal generator 106, a frame memory 108, a subtractor 110, a transformer 112, a quantizer 114, an inverse quantizer 116, an inverse transformer 118, an adder 120, a quantized transformed coefficient encoder 122, an output terminal 124, a prediction information estimator 126, a prediction information memory 128, a decision unit 130, a prediction information encoder 132, a region width determiner 134 and a region width encoder 136. The transformer 112, the quantizer 114, and the quantized transformed coefficient encoder 122 function as residual signal encoding means, or residual signal encoder unit, while the inverse quantizer 116 and the inverse transformer 118 function as residual signal restoration means, or a residual signal restoration unit. Accordingly, all of the functionality included in the image predictive encoding device 100 may be modules, components, and/or units. The term "module" "component" or "unit" may be defined to include one or more executable parts of the image predictive encoding/decoding system. As described herein, the modules, components, and/or units are defined to include software, hardware or some combination thereof executable by a processor (described later). Software included in the modules, components, and/or units may include instructions stored in memory or a computer readable medium that are executable by the processor, or any other processor. Hardware included in the modules, component, and/or units may include various devices, components, circuits, gates, circuit boards, and the like that are executable, directed, and/or controlled for performance by the processor. In other examples, fewer or additional modules, units and/or components may be used to describe the functionality of the image predictive encoding device 100.

Each component, module and/or unit of the image predictive encoding device 100 will be described below. The input terminal 102 is a terminal for inputting a signal of a moving picture. The signal of the moving picture is a signal that includes a plurality of images. The input terminal 102 is connected through a line L102 to the block division unit 104.

The block division unit 104, or region division unit, divides the image that is included in the signal of the moving picture into a plurality of regions. Specifically, the block division unit 104 may sequentially select the plurality of images that are included in the signal of the moving picture as an encoding target image. The block division unit 104 divides the selected image into a plurality of regions. In the present embodiment, the region is an 8×8 pixel block. However, blocks with different sizes and/or shapes may be used as the region. The block division unit 104 is connected through a line L104 to the prediction information estimator 126.

The prediction information estimator 126, or prediction information estimator unit, detects prediction information to produce a prediction signal of a target region (a target block) that is the target of encoding processing. As for a method for producing prediction information, the examples of previously described intra-picture prediction or inter-picture prediction that was described in the background art, is applicable. The image predictive encoding/decoding system, however, is not limited to such prediction methods, and any other prediction methods may be used. The description below is given in the case where the block matching shown in FIG. 21 is performed in a prediction process. When block matching is used, the prediction information includes motion vectors, reference picture selection information and the like, which is hereafter referred to as "prediction information." Hereinafter, prediction information that is detected to produce the prediction signal of the target block is referred to as "prediction information associated with a target block". The prediction information estimator 126 is connected through a line L126a and a line L126b to the prediction information memory 128 and the prediction information encoder 132, respectively.

The prediction information memory 128 receives the prediction information through the line L126a from the prediction information estimator 126 and stores the prediction information. The prediction information memory 128 is connected through a line L128 to the decision unit 130.

The prediction information encoder 132, or prediction information encoder unit, receives the prediction information through the line L126b from the prediction information estimator 126. The prediction information encoder 132 entropy-codes the received prediction information to produce encoded data and outputs the encoded data through a line L132 to the output terminal 124. Examples of entropy encoding include arithmetic coding, variable-length coding and the like, but the image predictor encoding/decoding system is not limited to such entropy encoding methods.

The decision unit 130 receives the prediction information associated with the target block and the prediction information associated with a neighbouring block through the line L128 from the prediction information memory 128. The neighbouring block is a neighbouring region located adjacent to the target block and is an already encoded region. The decision unit 130 compares the prediction information associated with the target block against the prediction information associated with the neighbouring block, and decides whether the prediction information associated with the neighbouring block can be used to produce the prediction signal of the target block.

Specifically, the decision unit 130 compares the prediction information associated with the target block against the prediction information associated with the neighbouring block, and when two or more pieces of prediction information substantially coincide, or match, it decides that the prediction information associated with the neighbouring block will not be used to produce the prediction signal of the target block. This is because, when the at least two pieces of prediction information substantially coincide, or match, the prediction signal of a partition of the target block produced by using the prediction information associated with the neighbouring block may achieve a similar, or the same result as the prediction signal produced by using the prediction information associated with the target block. That is, reduction in prediction error cannot be expected.

On the other hand, when the two or more pieces of prediction information are different, the decision unit 130 decides that the prediction information associated with the neighbouring block can be used to produce the prediction signal of the target block. The decision unit 130 is connected through a line L130 to the region width determiner 134 and the region width encoder 136, or region width encoding unit, and a comparison (decision) result by the decision unit 130 is output through the line L130 to the region width determiner 134 and the region width encoder 136. Hereinafter, the decision result of a case when the prediction information associated with the neighbouring block will not be used to produce the prediction signal of the target block, is referred to as the decision result indicating "unusable", while the decision result of a case when the prediction information associated with the neighbouring block can be used to produce the prediction signal of the target block, is referred to as the decision result indicating "usable". Operations of the decision unit 130 are described in detail below.

The region width determiner 134, or region width determination unit, receives the decision result through the line L130 from the decision unit 130. When the decision result indicates "usable", the region width determiner 134 determines a region width of the partition of the target block where the prediction signal is produced by using the prediction information associated with the neighbouring block. Therefore, the region width determiner 134 receives the prediction information associated with the target block and the prediction information associated with the neighbouring block through a line L128a from the prediction information memory 128. Furthermore, the region width determiner 134 receives a reconstructed signal from the frame memory 108 and receives an original signal of the target block from the block division unit 104.

Figure 2:
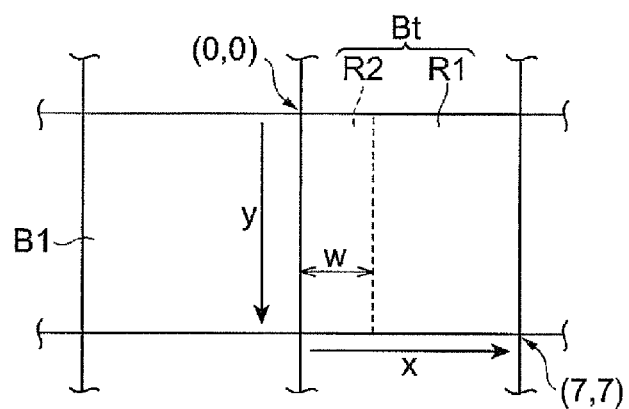
FIG. 2 is a diagram illustrating an example of a partition in a target block where a prediction signal is produced by using prediction information of a neighbouring block.

FIG. 2 is a diagram describing the partition of the target block where the prediction signal is produced by using the prediction information of the neighbouring block. FIG. 2 shows a case where an neighbouring block B1 on the edge of the target block, such as on the left of a target block Bt serves as the neighbouring block, but the neighbouring block in the image predictor encoding/decoding system may be an neighbouring block on a second side, such as the top of the target block or both neighbouring blocks, on a first and a second side, such as on the left and on the top of the target block, or blocks adjacent any one or more sides of the target block. There are cases that neighbouring blocks on the right and on the bottom of the target block can be used as the neighbouring block. As described herein, the edges of the target block may be a surface, a perimeter, border, or any other boundary or periphery of the target region.

As shown in FIG. 2, the target block Bt and the neighbouring block B1 are a 8×8 pixel block. In FIG. 2, a top-left pixel position (horizontal position, vertical position) is represented by (0, 0), while a bottom-right pixel position (horizontal position, vertical position) is represented by (7, 7). A partition R2 shown in FIG. 2 is a region where the prediction information of the neighbouring block B1 is used to produce the prediction signal and a region width thereof is w in a horizontal direction. That is, the partition R2 is surrounded by four pixel positions of (0, 0), (w−1, 0), (0, 7) and (w−1, 7). A partition R1 is a region where the prediction information associated with the target block is used to produce the prediction signal.

In the present embodiment, the region width can be set from 0 to 8 pixels with one pixel increment. The region width determiner 134 of the present embodiment produces the prediction signal of the target block with respect to each of 8 settable region widths and selects the region width having the lowest absolute sum of the prediction error or the lowest square sum thereof. The process is performed by acquiring an original signal of the target block and the prediction information associated with the target block and the prediction information associated with the neighbouring block from the block division unit 104 and the prediction information memory 128, respectively and by producing the prediction signal of the target block, based on these pieces of prediction information and the region width, from the reconstructed signal that is stored in the frame memory 108. A method for determining the region width and candidates for the settable region width are not particularly limited. For example, the settable region widths may be pixel widths that are specified by multiples of 2, and can take any one or more width. Additionally, a plurality of settable region widths are prepared and selection information may be encoded for each sequence unit, each frame unit or each block unit.

The region width determiner 134 is connected through a line L134a and a line L134b to the region width encoder 136 and the prediction signal generator 106, respectively. The region width determiner 134 outputs the determined region width (information identifying the region width) through the line L134a and the line L134b to the region width encoder 136 and the prediction signal generator 106.

When the decision result received from the decision unit 130 indicates "usable", the region width encoder 136 entropy-codes the region width received through the line L134a to produce encoded data. The region width encoder 136 may use an entropy-coding method, such as arithmetic coding or variable-length coding, but the image predictor encoding/decoding system is not limited to such encoding methods.

The region width encoder 136 is connected through a line L136 to the output terminal 124, and the encoded data produced by the region width encoder 136 is output through the line L136 to the output terminal 124.

The prediction signal generator 106, or prediction signal production unit, receives two pieces of prediction information associated with the target block and the neighbouring block through a line L128b from the prediction information memory 128. Additionally, the prediction signal generator 106 receives the region width through the line L134b from the region width determiner 134, and receives the reconstructed signal through a line L108 from the frame memory 108. The prediction signal generator 106 may use one or more of the at least two pieces of prediction information and the region width received to produce the prediction signal of the target block from the reconstructed signal. Examples of a method for producing the prediction signal are described below. The prediction signal generator 106 is connected through a line L106 to the subtractor 110. The prediction signal produced by the prediction signal generator 106 is output through the line L106 to the subtractor 110.

The subtractor 110 is connected through a line L104b to the block division unit 104. The subtractor 110 subtracts the prediction signal of the target block produced by the prediction signal generator 106 from the original signal of the target block, which is received through the line L104b from the block division unit 104. A residual signal is produced through such subtraction. The subtractor 110 is connected through a line L110 to the transformer 112 and the residual signal is output through the line L110 to the transformer 112.

The transformer 112 applies a discrete cosine transform to the input residual signal to produce transformed coefficients. The quantizer 114 receives the transformed coefficients through a line L112 from the transformer 112. The quantizer 114 quantizes the transformed coefficients to produce quantized transformed coefficients. The quantized transformed coefficient encoder 122 receives the quantized transformed coefficients through a line L114 from the quantizer 114 and entropy-codes the quantized transformed coefficients to produce encoded data. The quantized transformed coefficient encoder 122 outputs the encoded data produced through a line L122 to the output terminal 124. As an entropy-coding method for the quantized transformed coefficient encoder 122, arithmetic coding or variable-length coding may be used, but the image predictor encoding/decoding system is not limited to such coding methods.

The output terminal 124 collectively outputs the encoded data received from the prediction information encoder 132, the region width encoder 136 and the quantized transformed coefficient encoder 122, to modules or devices outside, or external to, the image predictive encoding device 100.

The inverse quantizer 116 receives the quantized transformed coefficients through a line L114b from the quantizer 114. The inverse quantizer 116 inversely quantizes the received quantized transformed coefficients to restore transformed coefficients. The inverse transformer 118 receives the transformed coefficients through a line L116 from the inverse quantizer 116 and applies an inverse discrete cosine transform to the transformed coefficients so as to restore a residual signal (decoded residual signal). The adder 120, or adder unit, receives the decoded residual signal through a line L118 from the inverse transformer 118 and receives the prediction signal through a line L106b from the prediction signal generator 106. The adder 120 adds the received decoded residual signal to the prediction signal to reproduce a signal of the target block (reconstructed signal). The reconstructed signal produced by the adder 120 is output through a line L120 to the frame memory 108, or storage unit, and is stored in the frame memory 108 as the reconstructed signal. In other examples, the reconstructed signal may be store in any other storage unit internal to, or external to the image predictive encoding device 100.

The present embodiment uses the transformer 112 and the inverse transformer 118, but another transform process may be used as alternatives of these transformers. In addition, the transformer 112 and the inverse transformer 118 are not indispensable. In this way, in order to be used for producing the prediction signal of the subsequent target block, the reconstructed signal of the encoded target block is restored in an inverse process and stored in the frame memory 108.

Moreover, the structure of the encoder is not limited to the one shown in FIG. 1. For example, the decision unit 130 and the prediction information memory 128 may be included in the prediction signal generator 106. In addition, the region width determiner 134 may be included in the prediction information estimator 126.

With reference to operations of the image predictive encoding device 100, an image predictive encoding method of one embodiment is described below. In addition, detailed operations of the decision unit 130, the region width determiner 134 and the prediction signal generator 106 are described.

Figure 3:
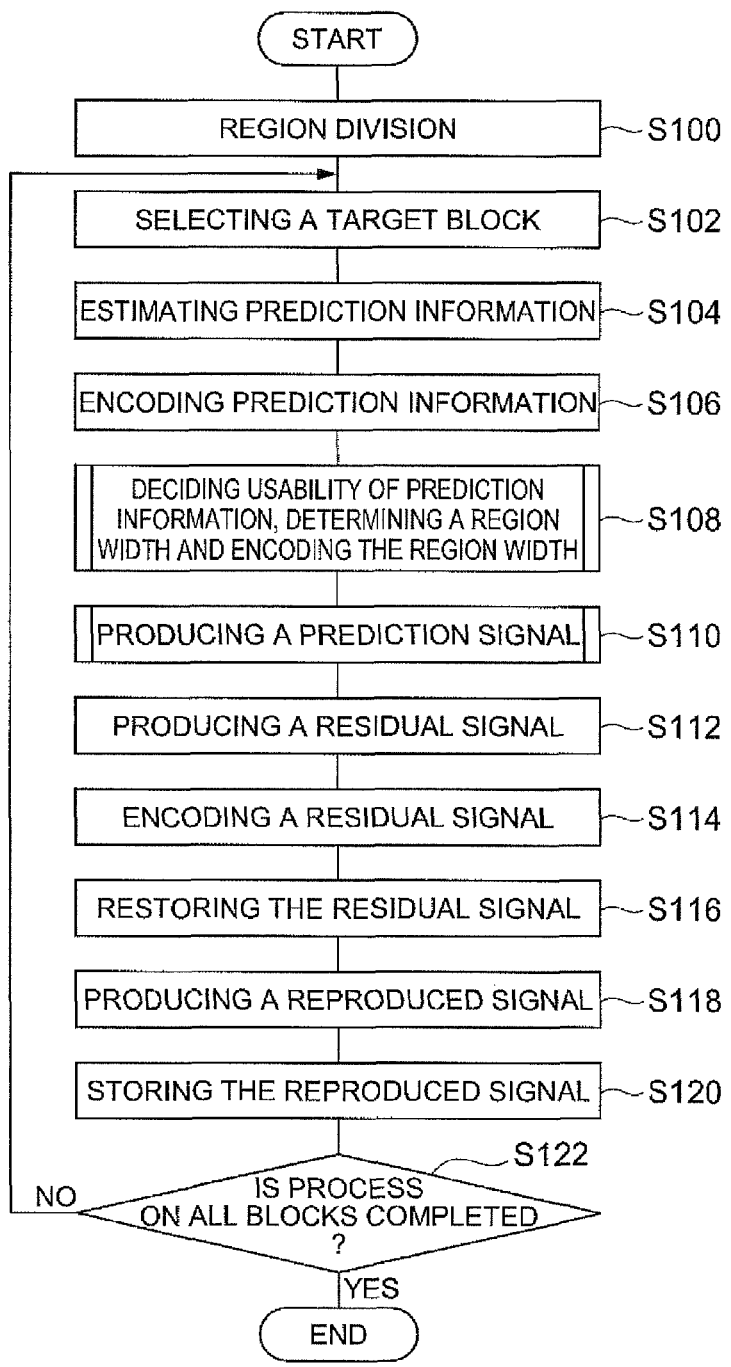
FIG. 3 is a flowchart showing example procedures of an image predictive encoding method according to one embodiment.

FIG. 3 is a flowchart showing procedures of the image predictive encoding method according to one example embodiment. As shown in FIG. 3, in the present image predictive encoding method, first in step S100, the block division unit 104 divides an encoding target image into a plurality of blocks. Then in step S102, one block is selected from the plurality of blocks as an encoding target block.

Then in step S104, the prediction information estimator 126 determines prediction information of the target block. The prediction information is encoded in the following step S106 by the prediction information encoder 132.

Figure 4:
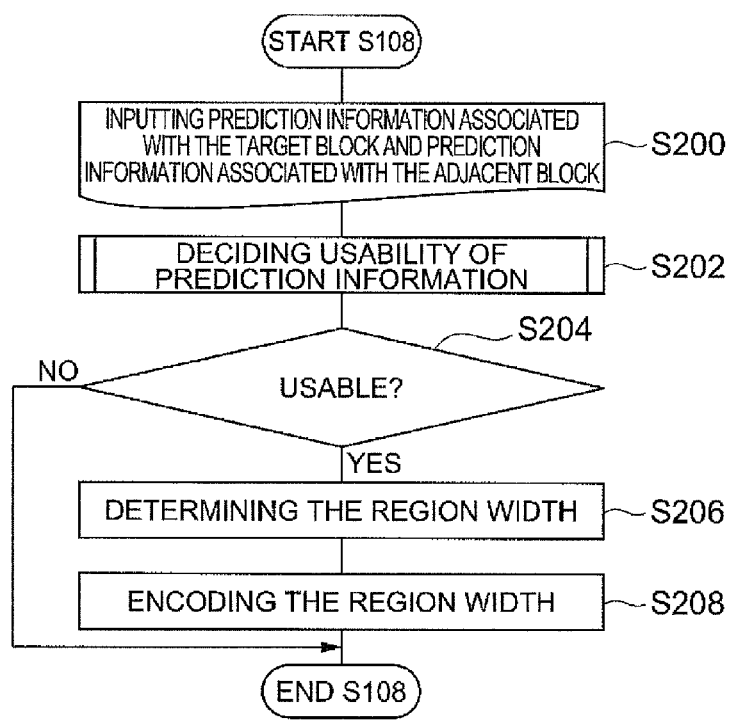
FIG. 4 is a detailed flowchart of an example of step S108 in FIG. 3.

Next, the present image predictive encoding method proceeds to step S108. FIG. 4 is a detailed flowchart of step S108 in FIG. 3. In the process of step S108, first in step S200, two or more pieces of prediction information associated with the target block and the neighbouring block are input in the decision unit 130. Then in step S202, the decision unit 130 decides whether the prediction information of the neighbouring block can be used to produce the prediction signal of the target block.

Figure 5:
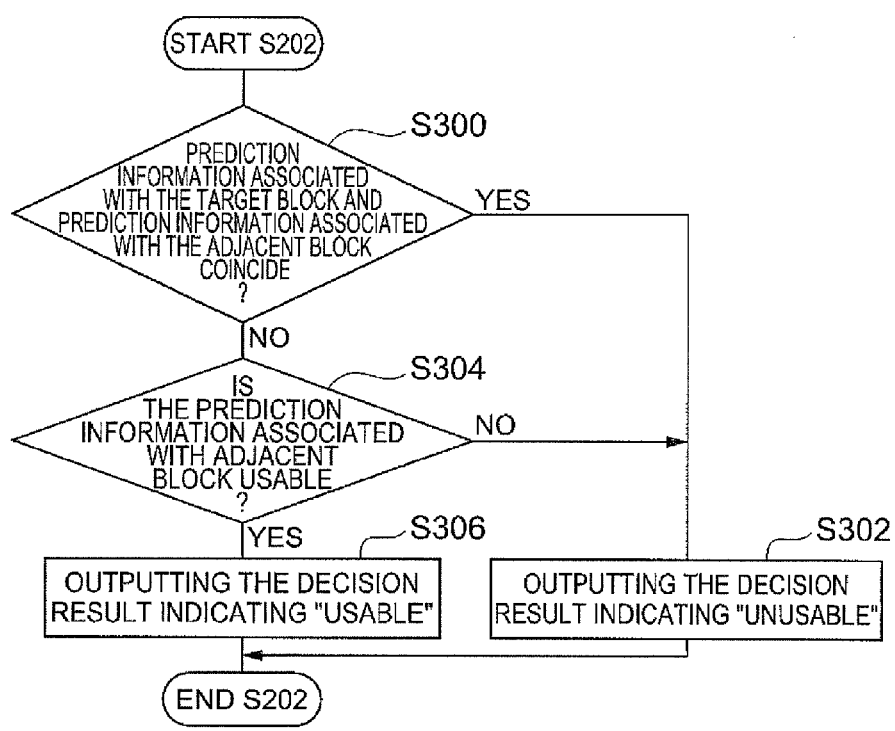
FIG. 5 is a detailed flowchart of an example of step S202 in FIG. 4.

FIG. 5 is a detailed flowchart of step S202 in FIG. 4. As shown in FIG. 5, in the process of step S202, first in step S300, the decision unit 130 decides whether the at least two pieces of prediction information associated with the target block and the neighbouring block coincide. When the decision in step S300 is true (Yes), that is when the at least two pieces of prediction information associated with the target block and the neighbouring block coincide, the decision unit 130 outputs a decision result indicating "unusable" in step S302.

On the other hand, when the decision in step S300 is false (No), the process proceeds to step S304. In step S304, the decision unit 130 decides whether the prediction information associated with the neighbouring block is in a usable state to produce the prediction signal of the target block. When the decision in step S304 is true (Yes), the decision unit 130 outputs the decision result indicating "usable" in the following step S306. On the other hand, when the decision in step S304 is false (No), the decision unit 130 conducts the process of step S302 described above.

When it is decided that the prediction information associated with the neighbouring block is in an unusable state in step S304, there are cases where (1) the neighbouring block is outside a picture; (2) a combination of the prediction information of the target block and the prediction information of the neighbouring block is not approved; and the like.

In this way, the decision unit 130 decides, in accordance with a predetermined rule, whether to use the prediction information associated with the neighbouring block to produce the prediction signal of the partition of the target region. The rule is not required to be transmitted, if the encoder and the decoder share the information in advance, but it may be encoded and transmitted. For example, there is a method in which a plurality of such rules are prepared and which rule to be applied is transmitted for each frame unit, each sequence unit, or each block unit.

Referring to FIG. 4 again, next, the present image predictive encoding method proceeds to step S204. In step S204, the region width determiner 134 refers to the decision result of the decision unit 130 and decides whether the decision result indicates "usable" or not. When the decision result of the decision unit 130 indicates "unusable", the process of step S108 ends.

On the other hand, when the decision result of the decision unit 130 indicates "usable", the region width determiner 134 selects, in the following step S206, the region width of the partition of the target region to be predicted by using the prediction information associated with the neighbouring block, from among candidates prepared in advance. Then in step S208, the region width encoder 136 encodes the determined region width.

Referring to FIG. 3 again, the process proceeds from step S108 to step S110. In step S110, the prediction signal generator 106 may use the at least two pieces of prediction information associated with the target block and the neighbouring block, and the region width determined by the region width determiner 134, to produce the prediction signal of the target block from the reconstructed signal stored in the frame memory 108.

Figure 6:
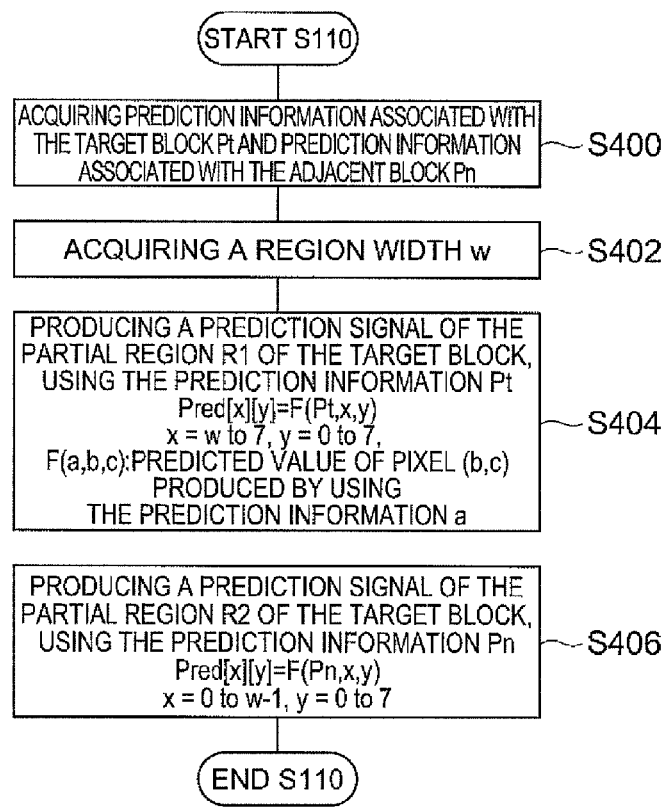
FIG. 6 is a detailed flowchart of an example of step S110 in FIG. 3.

One example of detailed operations of the prediction signal generator 106 in step S110 is described below. FIG. 6 is a detailed flowchart of step S110 in FIG. 3. FIG. 6 shows operations of the prediction signal generator 106, when, as shown in FIG. 2, the prediction signal of a partition R2 in a 8×8 pixel target block is produced by using the prediction information associated with the neighbouring block on the left, or neighbouring, a side of the target block.

As shown in FIG. 6, first in step S400, the prediction signal generator 106 acquires prediction information Pt associated with the target block and prediction information Pn associated with the neighbouring block. Then in step S402, the prediction signal generator 106 acquires a region width w from the region width determiner 134.

Next in step S404, the prediction signal generator 106 may use at least one of the prediction information Pt and the region width w to produce the prediction signal of the partition R1 in the target block shown in FIG. 2 from the reconstructed signal. Next in step S406, the prediction signal generator 106 may use at least one of the prediction information Pn and the region width w to produce a prediction signal of the partition R2 in the target block from the reconstructed signal. In the example shown in FIG. 2, when the region width w is 0, step S406 can be omitted. In addition, when the region width is 8, step S404 can be omitted.

Referring to FIG. 3 again, the image predictive encoding method proceeds to step S112. In step S112, the subtractor 110 uses the original signal and the prediction signal of the target block to produce a residual signal. In the following step S114, the transformer 112, the quantizer 114 and the quantized transformed coefficient encoder 122 may transform and encode the residual signal to produce encoded data.

Then in step S116, the inverse quantizer 116 and the inverse transformer 118 may restore a decoded residual signal from quantized transformed coefficients. In the following step S118, the adder 120 adds the decoded residual signal to the prediction signal to produce a reconstructed signal. Then in step S120, the reconstructed signal is stored in the frame memory 108 as the reconstructed signal.

Next in step S122, whether all blocks are processed as the target block is checked and when the process on all blocks is uncompleted, one of unprocessed blocks is selected as the target block and the process from step S102 is performed. On the other hand, when the process on all blocks is completed, the process of the present image predictive encoding method ends.

Figure 7:
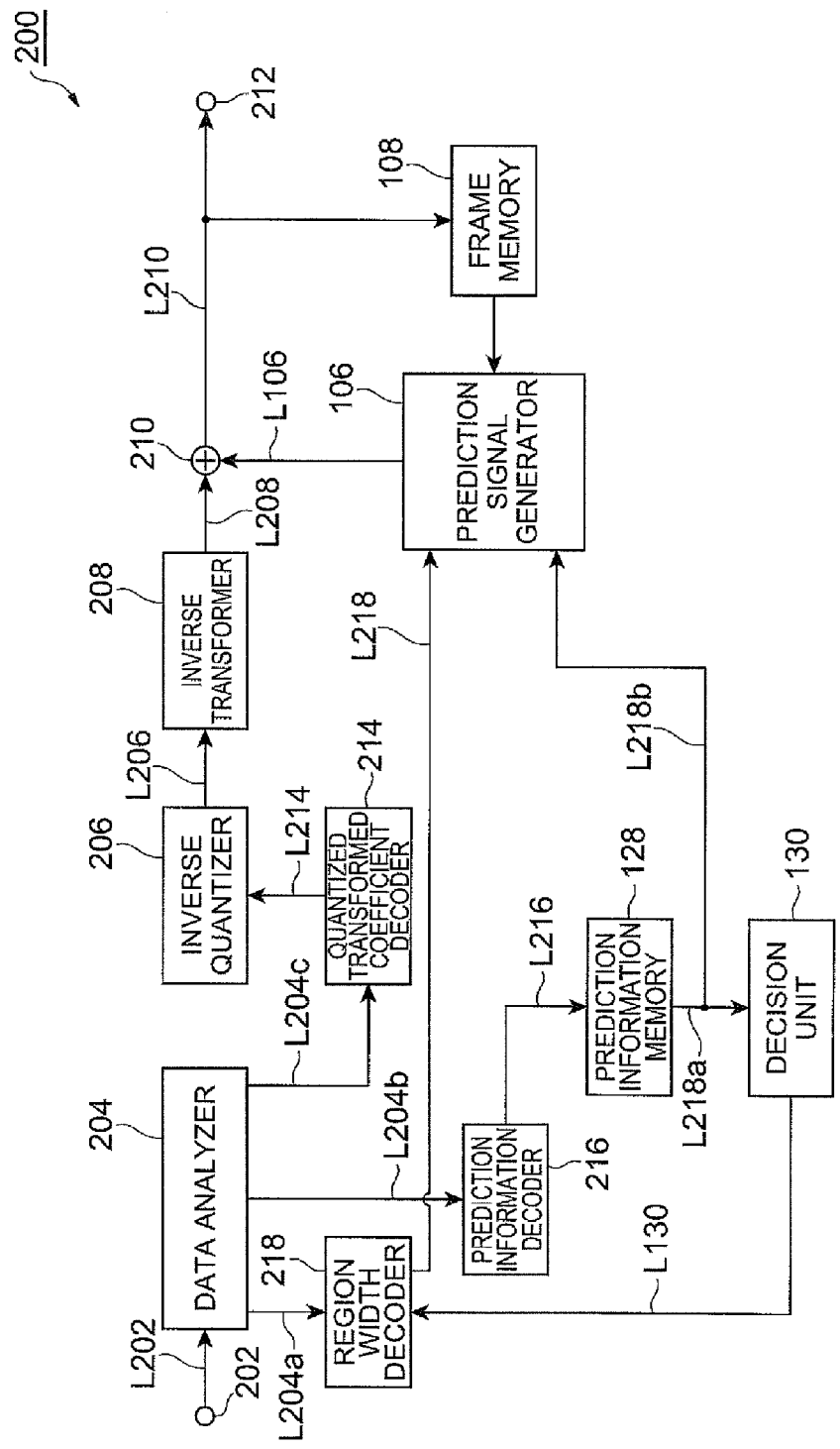
FIG. 7 is a diagram showing an example of an image predictive decoding device according to one embodiment.

An image predictive decoding device according to one embodiment is described below. FIG. 7 is a diagram showing the image predictive decoding device according to one example embodiment. An image predictive decoding device 200 shown in FIG. 7 is provided with a plurality of modules, units, and/or components. The image predictive decoding device 200 may be a computing device or computer, including for example software, hardware, or a combination of hardware and software, as described later, capable of performing the described functionality. The image predictive decoding device 200 may be one or more separate systems or devices, may be one or more systems or devices included in the image predictive encoding/decoding system, or may be combined with other systems or devices within the image predictive encoding/decoding system. In other examples, fewer or additional blocks may be used to illustrate the functionality of the image predictive decoding device 200. The modules, units and/or components of the image predictive decoding device 200 may include an input terminal 202, a data analyzer 204, an inverse quantizer 206, an inverse transformer 208, an adder 210, an output terminal 212, a quantized transformed coefficient decoder 214, a prediction information decoder 216, a region width decoder 218, the frame memory 108, the prediction signal generator 106, the prediction information memory 128, and the decision unit 130. The inverse quantizer 206, the inverse transformer 208 and the quantized transformed coefficient decoder 214 function as residual signal restoration unit. For decoding means including the inverse quantizer 206 and the inverse transformer 208, alternatives may be used. In addition, the inverse transformer 208 may be eliminated. The functionality included in the image predictive decoding device 200 may be modules, components and/or units. The term "module" or "component" or "unit" may be defined to include one or more executable parts of the image predictive encoding/decoding system. As described herein, the modules and/or units are defined to include software, hardware or some combination thereof executable by a processor (described later). Software included in the modules and/or units may include instructions stored in memory or a computer readable medium that are executable by the processor, or any other processor. Hardware included in the modules and/or units may include various devices, components, circuits, gates, circuit boards, and the like that are executable, directed, and/or controlled for performance by the processor.

Each component, unit or module of the image predictive decoding device 200 is described in detail below. The input terminal 202 inputs data, such as compressed data that has been compression-encoded by the image predictive encoding device 100 (or the image predictive encoding method) described above. The compressed data includes, with respect to each of a plurality of blocks in an image, encoded data of quantized transformed coefficients produced by transform-quantizing and entropy-coding a residual signal; encoded data of prediction information for producing a prediction signal; and encoded data of a region width of a partition in the block where the prediction signal is produced by using the prediction information associated with a neighbouring block located neighbouring, adjacent to, or beside, a target block. In the present embodiment, the prediction information includes a motion vector and a reference picture number and the like. The input terminal 202 is connected via a line L202 to the data analyzer 204.

The data analyzer 204, or data analysis unit, receives the compressed data through the line L202 from the input terminal 202. The data analyzer 204 analyzes the received compressed data and separates the compressed data, with respect to a decoding target block, into the encoded data of the quantized transformed coefficients; the encoded data of the prediction information; and the encoded data of the region width. The data analyzer 204 outputs the encoded data of the region width through a line L204a to the region width decoder 218; or region width decoding unit, outputs the encoded data of the prediction information through a line L204b to the prediction information decoder 216; or prediction information decoding unit, and outputs the encoded data of the quantized transformed coefficients through a line L204c to the quantized transformed coefficient decoder 214.

The prediction information decoder 216 entropy-decodes the encoded data of the prediction information associated with the target block to obtain prediction information. The prediction information decoder 216 is connected through a line L216 to the prediction information memory 128. The prediction information produced by the prediction information decoder 216 is stored through the line L216 in the prediction information memory 128. The prediction information memory 128 is connected through the line L128a and the line L128b to the decision unit 130 and the prediction signal generator 106, respectively.

The decision unit 130 has similar functionality to the decision unit 130 of the encoding device shown in FIG. 1. That is, the decision unit 130 compares the prediction information associated with the target block against the prediction information associated with the neighbouring block located adjacent to the target block, and decides whether the prediction information associated with the neighbouring block can be used when producing the prediction signal of the target block.

Specifically, the decision unit 130 compares at least two pieces of prediction information associated with the target block and the neighbouring block located adjacent with each other, and when the at least two pieces of prediction information coincide, it decides that the prediction information associated with the neighbouring block will not be used to produce the prediction signal of the target block. That is, in such case, the decision unit 130 outputs a decision result indicating "unusable". On the other hand, when the at least two pieces of prediction information are different, the decision unit 130 outputs the decision result indicating "usable". The decision unit 130 is connected through the line L130 to the region width decoder 218. The decision result by the decision unit 130 is output through the line L130 to the region width decoder 218. Since a detailed example process flow of the process of the decision unit 130 was described with reference to FIG. 5, the detailed description is omitted here.

The region width decoder 218 entropy-decodes, based on the decision result received through the L130 from the decision unit 130, the input encoded data of the region width to restore the region width. That is, when the decision result indicates "usable", the region width decoder 218 decodes the encoded data of the region width to restore the region width. On the other hand, when the decision result is "unusable", restoration of the region width may not be conducted. The region width decoder 218 is connected through a line L218 to the prediction signal generator 106, and the region width produced by the region width decoder 218 is output through the line L218 to the prediction signal generator 106.

The prediction signal generator 106, or prediction signal production unit, has a similar function to the prediction signal generator of the encoding device 100 shown in FIG. 1. That is, the prediction signal generator 106 uses at least one of the prediction information associated with the target block and the prediction information associated with the neighbouring block (if necessary), and the region width received through the L218, so as to produce the prediction signal of the decoding target block from the reconstructed signal stored in the frame memory 108. Since detailed example operations of the prediction signal generator 106 are described in FIG. 6, detailed description is omitted here. The prediction signal generator 106 is connected through the line L106 to the adder 210. The prediction signal generator 106 outputs the produced prediction signal through the line L106 to the adder 210.

The quantized transformed coefficient decoder 214 receives the encoded data of the quantized transformed coefficients through the line L204c from the data analyzer 204. The quantized transformed coefficient decoder 214 entropy-decodes the received encoded data to restore the quantized transformed coefficients of the residual signal of the target block. The quantized transformed coefficient decoder 214 outputs the restored quantized transformed coefficients through a line L214 to the inverse quantizer 206.

The inverse quantizer 206 inversely quantizes the quantized transformed coefficients received through the line L214 to restore the transformed coefficients. The inverse transformer 208 receives the restored transformed coefficients through a line L206 from the inverse quantizer 206 and applies an inverse discrete cosine transform to the transformed coefficients to restore the residual signal (decoded residual signal) of the target block.

The adder 210, or adder unit, receives the decoded residual signal through a line L208 from the inverse transformer 208 and receives the prediction signal produced by the prediction signal generator 106 through the line L106. The adder 210 produces a reconstructed signal of the target block by adding the received decoded residual signal to the prediction signal. The reconstructed signal is output through a line L210 to the frame memory 108 and stored in the frame memory 108, or storage unit. In other examples, the reconstructed signal may be store in any other storage unit internal to, or external to the image predictive decoding device 200. In addition, the reconstructed signal is also output to the output terminal 212. The output terminal 212 outputs the reconstructed signal to the outside, or external to the image predictive decoding device 200. (to a display, for example).

Figure 8:
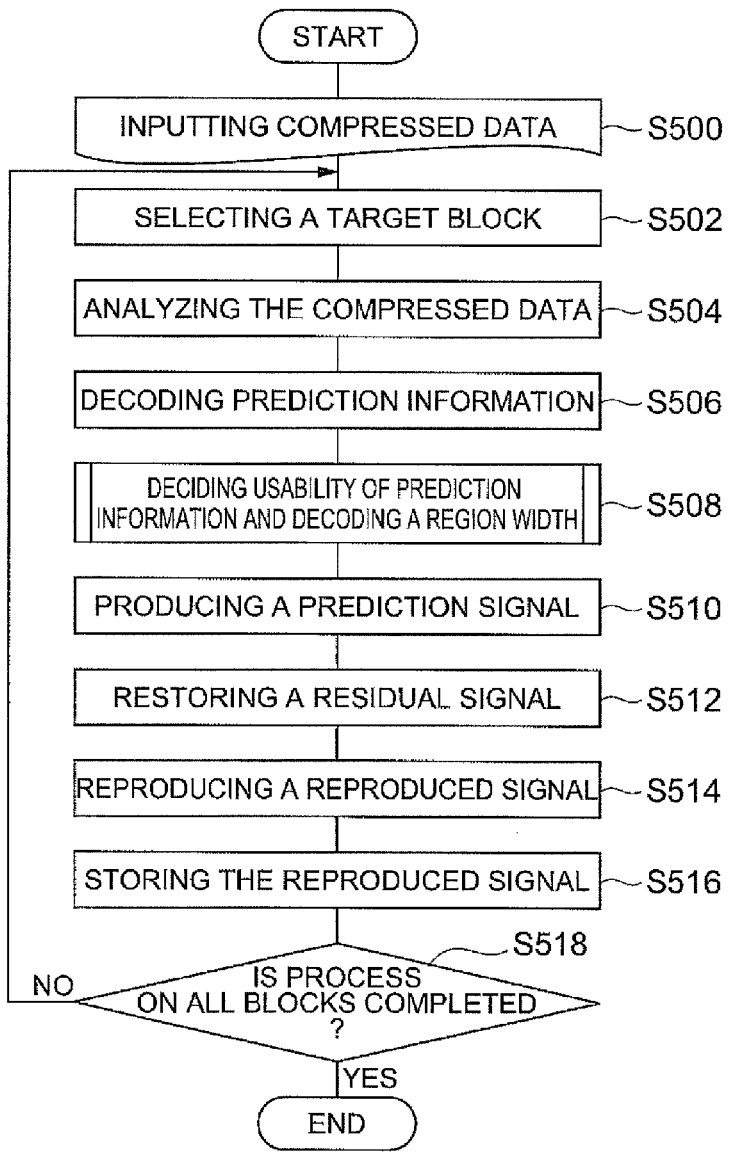
FIG. 8 is a flowchart of an example of an image predictive decoding method according to one embodiment.

With reference to operations of the image predictive decoding device 200, an image predictive decoding method according to one embodiment is described below. FIG. 8 is a flowchart of the image predictive decoding method according to one example embodiment. As shown in FIG. 8, in the present image predictive decoding method, first in step S500, compressed data is input through the input terminal 202. Then in step S502, a target block that is the target of the process is selected.

Then in step S504, the data analyzer 204 analyzes the compressed data and extracts encoded data of prediction information associated with the target block that is a decoding target; of a region width; and of quantized transformed coefficients. The prediction information is decoded by the prediction information decoder 216 in step S506.

Figure 9:
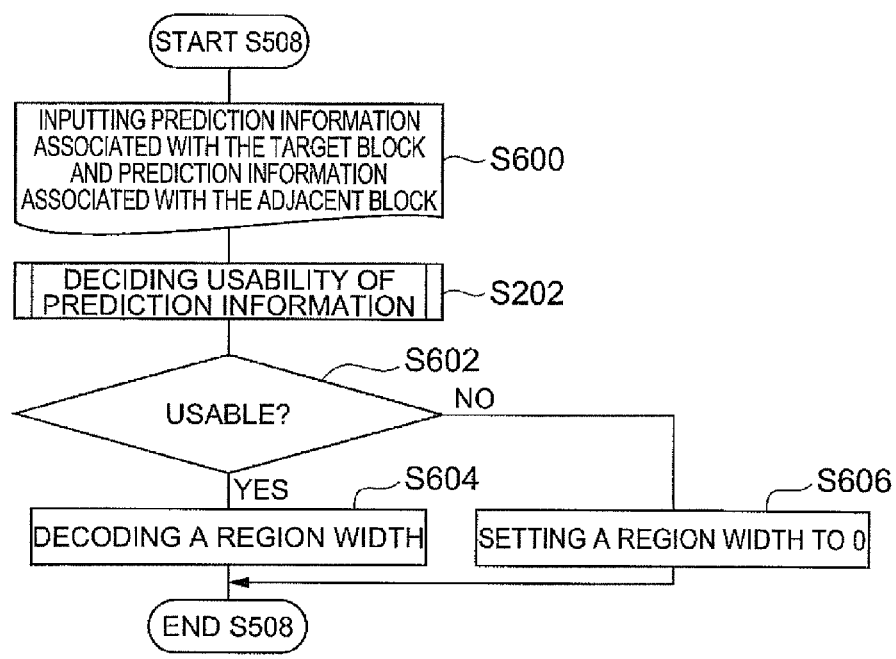
FIG. 9 is a detailed flowchart of an example of step S508 in FIG. 8.

Next, the process proceeds to step S508. FIG. 9 is a detailed flowchart of an example of step S508 in FIG. 8. As shown in FIG. 9, in the process of step S508, first in step S600, at least two pieces of prediction information associated with the target block and a neighbouring block are input in the decision unit 130.

Next in step S202, the decision unit 130 decides usability of the prediction information associated with the neighbouring block and outputs a decision result. The operations of the decision unit 130 in step S202 is similar to the operations described in FIG. 5, so detailed description is omitted here.

Then in step S602, it is decided whether the decision result of the decision unit 130 indicates "usable" or not. When the decision result in step S602 is true (Yes), that is, when the prediction information of the neighbouring block is usable, the region width decoder 218 decodes the encoded data of the region width to restore the region width of a partition (R2) of the target block in step S604. On the other hand, when the decision in step S602 is false (No), the region width decoder 218 sets the region width of the partition (R2) of the target block to 0 in step S606.

Referring to FIG. 8 again, after step S508 ends, the process proceeds to step S510. In step S510, the prediction signal generator 106 produces a prediction signal of the decoding target block from the reconstructed signal by using at least one of the two pieces of prediction information associated with the target block and the neighbouring block (prediction information associated with the neighbouring block is used only when it is necessary), and/or the region width. Here, step S510 is the same as step S110 described in FIG. 6.

In the following step S512, the quantized transformed coefficient decoder 214 restores quantized transformed coefficients from the encoded data; the inverse quantizer 206 restores transformed coefficients from the quantized transformed coefficients; and the inverse transformer 208 produces a decoded residual signal from the transformed coefficients.

Then in step S514, the adder 210 produces a reconstructed signal of the target block by adding the prediction signal of the target block to the decoded residual signal. In step S516, the reconstructed signal is stored in the frame memory 108 as the reconstructed signal for reproducing the next target block.

Then in step S518, when it is decided that the process on all blocks is incomplete, that is when the next compressed data exists, an unprocessed block is selected as the target block in step S502 and the steps thereafter are repeated. On the other hand, when the process on all blocks is completed in step S518, the process ends.

The image predictive encoding device and method as well as the image predictive decoding device and method have been described above, but the image predictor encoding/decoding system is not limited to the embodiments mentioned previously. For example, the neighbouring block in the above embodiment is the neighbouring block on the left of the target block, but it may be the neighbouring block on top of the target block. In other examples, a first neighbouring block may be on a first side of the target block, and a second neighbouring block may be on a second side of the target block, where the sides of the target blocks may be a top, bottom, side, a surface, a perimeter, border, or any other boundary or periphery of the target region.

Figure 10:
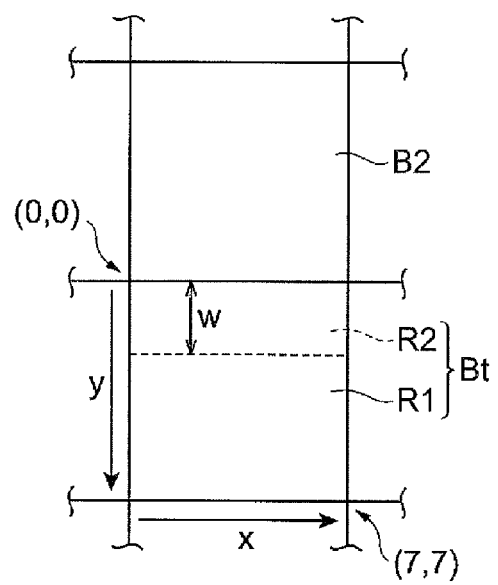
FIG. 10 is a diagram illustrating another example of the neighbouring block.

FIG. 10 is a diagram describing another example of the neighbouring block. In the example shown in FIG. 10, the target block Bt and the neighbouring block B2 are a 8×8 pixel block, and similarly a top-left pixel position (horizontal position, vertical position) is set to (0, 0), while a bottom-right pixel position is set to (7, 7). The partition R2 is a region surrounded by pixel positions (0, 0), (7, 0), (0, w−1) and (7, w−1) and the region where the prediction information of the neighbouring block B2 is likely to be used to produce the prediction signal. The region width of the partition R2 is w.

When the prediction information associated with the neighbouring block B2 shown in FIG. 10 is used to produce the prediction signal of the partition R2, a range of x in step S404 of FIG. 6 is 0 to 7, while a range of y is w to 7. In addition, the range of x in step S406 of FIG. 6 is 0 to 7, while the range of y is 0 to w−1.

In addition, the neighbouring block may be at least two neighbouring blocks one of which is on a first side of the target block, such as on the left of the target block, and the other is on a second side of the target block, such as the top of the target block, and it is possible to select either of the at least two neighbouring blocks with respect to each target block. In such case, the prediction signal generator 106 has a function of performing the prediction process described with reference to FIG. 4 and FIG. 10, and the region width determiner 134 includes a function of selecting one or more of the neighbouring blocks having the prediction information that is used to predict the partition of the target block, that is, either the neighbouring block on the left, on the right, on the bottom, on the top and/or on any other side of the target block. Alternatively or in addition, in other examples, a first neighbouring block is positioned along a first side of the target block and a second neighbouring block is positioned along a second side of the target block. In addition, the region width encoder 136 includes a function of encoding identification information that identifies the neighbouring block having the prediction information to be used to produce the prediction signal of the target region, from the at least two pieces of prediction information associated with the at least two neighbouring blocks, while the region width decoder 218 includes a function of decoding the identification information.

Figure 11:
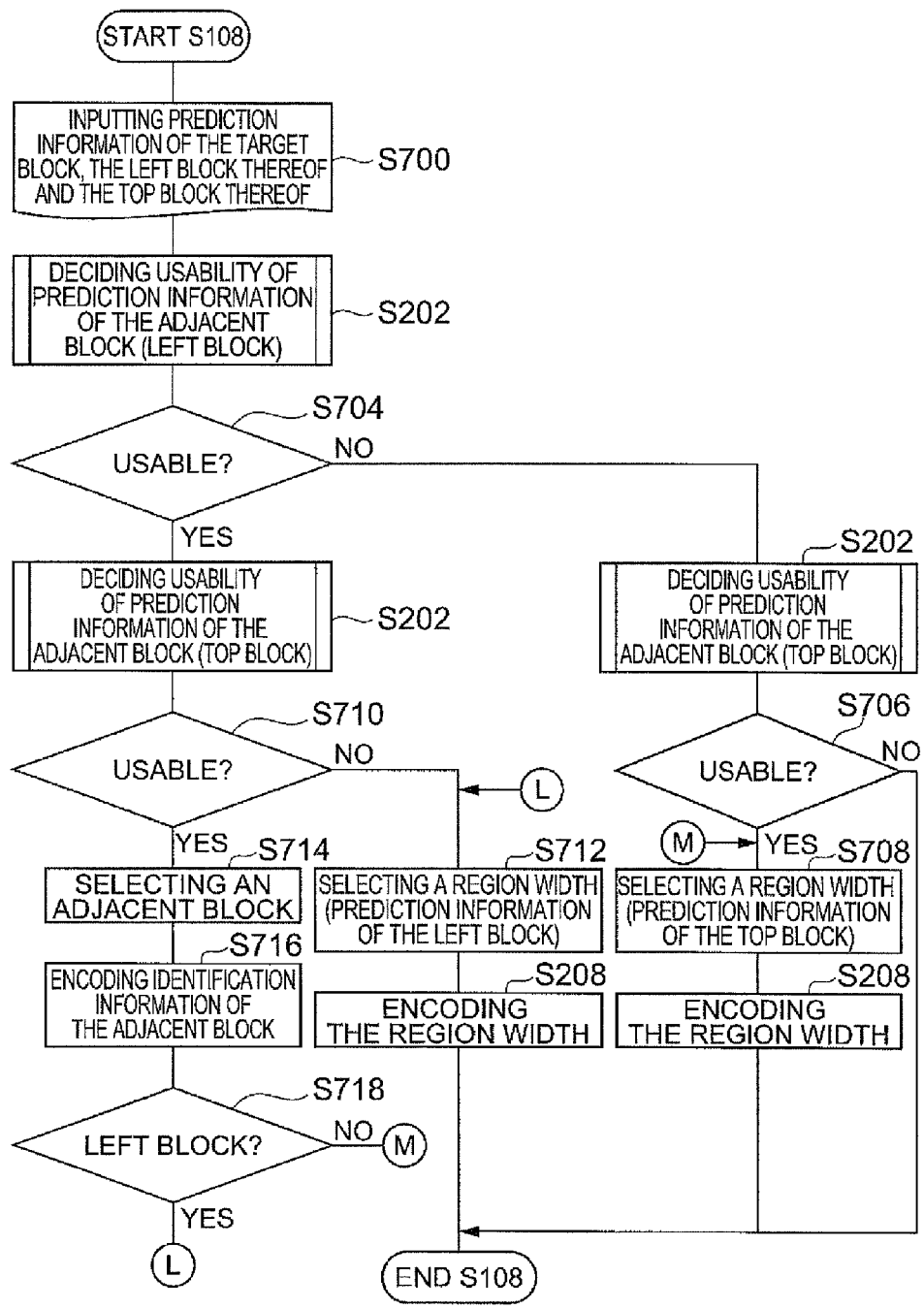
FIG. 11 is a flowchart showing detailed procedures of another example of step S108 in FIG. 3.

Detailed description is given below for step S108 when using an example of at least two neighbouring blocks on the left and on the top. In other examples, at least a first neighbouring block may be positioned along a first side of the target block and at least a second neighbouring block may be positioned along a second side of the target block. The neighbouring blocks may be, for example, contiguous with the edges of the target block. FIG. 11 is a flowchart showing detailed procedures of another example of step S108 in FIG. 3. As shown in FIG. 11, in the process of step S108 of the present example, at least two pieces of prediction information associated with neighbouring blocks on a first side and/or a second side, such as on the top of and on the left of the target block are input in the decision unit 130 in step S700.

Next, the decision unit 130 decides, in accordance with the procedures shown in step S202 of FIG. 5, whether the prediction information associated with the neighbouring block on the left of the target block, or positioned neighbouring a first side of the target block, can be used to produce the prediction signal of the partition of the target block, and outputs a decision result. Then in step S704, when it is decided that the decision result of the decision unit 130 indicates "unusable" (in the case of No), that is, when the decision result shows that the prediction information associated with the neighbouring block on the first side, such as on the left will not be used to produce the prediction signal of the partition of the target block; the procedure proceeds to the following step S202. The decision unit 130 decides, in accordance with the procedures shown in step S202 of FIG. 5, whether the prediction information associated with the neighbouring block on the top of the target block, or positioned neighbouring a second side of the target block, can be used to produce the prediction signal of the partition of the target block and outputs a decision result.

Then, in step S706, when it is decided that the decision result of the decision unit 130 indicates "unusable" (in the case of No), that is, when the decision result shows that the prediction information associated with the neighbouring block on the second side, such as the top, will not be used to produce the prediction signal of the partition of the target block; the process of step S108 ends.

On the other hand, in step S706, when it is decided that the decision result of the decision unit 130 indicates "usable" (in the case of Yes), the region width determiner 134 determines, in step S708, the region width w of the partition R2 (refer to FIG. 10) of the target block, where the prediction signal is produced by using the prediction information of the neighbouring block on the second side, such as the top. Then, in the following step S208, the region width w is encoded by the region width encoder 136.

On the other hand, back in step S704, when it is decided that the decision result of the decision unit 130 indicates "usable" (in the case of Yes), the decision unit 130 decides in the following step S202, in accordance with the procedures shown in step S202 of FIG. 4, whether the prediction information associated with the neighbouring block on the second side, such as the top of the target block can be used to produce the prediction signal of the partition of the target block and outputs a decision result.

Then in step S710, when it is decided that the decision result of the decision unit 130 indicates "unusable" (in the case of No), the region width determiner 134 determines, in the following step S712, the region width w of the partition R2 (refer to FIG. 2) of the target block, where the prediction signal is produced by using the prediction information of the neighbouring block on a first side, such as on the left. Then, the region width w is encoded by the region width encoder 136 in the following step S208.

On the other hand, in step S710, when it is decided that the decision result of decision unit 130 indicates "usable" (in the case of Yes), the neighbouring block having the prediction information to be used to produce the prediction signal is selected in the following step S714 from the neighbouring block on the first side, such as the left and the neighbouring block on the second side, such as the top.

Specifically, in step S714, the region width determiner 134 selects which of the prediction information of the neighbouring block on the second side, such as the top and the prediction information of the neighbouring block on the first side, such as the left is to be used to produce the prediction signal of the partition of the target block. The method for selection is not limited, but for example, the region width determiner 134 sets the widths of the neighbouring block and of the partition R2, as shown in FIG. 2 and FIG. 10; produces the prediction signal of the target block by using the prediction information of the neighbouring block and the prediction information of the target block; and selects a group of the neighbouring block and the region width that makes prediction errors of the target block the smallest. Then in the following step S716, the region width encoder 136 encodes identification information identifying the neighbouring block having the selected prediction information. Next, in step S718, when it is decided that the neighbouring block on the first side, such as the left is selected, the process proceeds to step S712. On the other hand, in step S718, when it is decided that the neighbouring block on the first side, such as the left is not selected, that is, when it is decided that the neighbouring block on the second side, such as the top is selected, the process proceeds to step S708.

Figure 12:
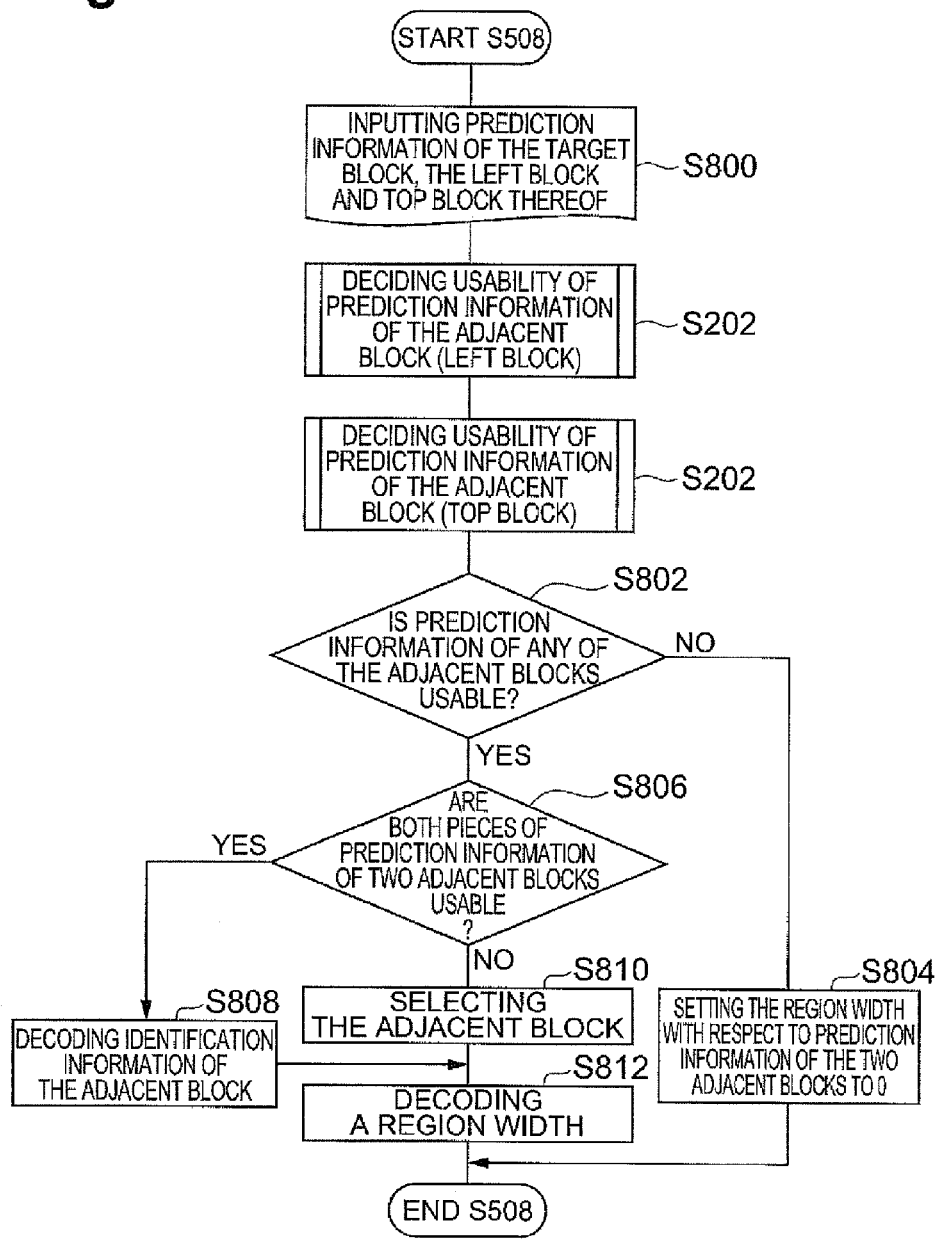
FIG. 12 is a flowchart showing detailed procedures of another example of step S508 in FIG. 8.

FIG. 12 is a flowchart showing detailed procedures of another example in step S508 of FIG. 8, which shows procedures used in decoding corresponding to encoding where the process of FIG. 11 is used. As shown in FIG. 12, in this example, first in step S800, the prediction information associated with the neighbouring block on the first side, such as on the left of the target block and the prediction information associated with the neighbouring block on the second side, such as the top are input in the decision unit 130. In other examples, the neighbouring blocks may be aligned neighbouring an edge, a surface, a side or any other boundary or perimeter of the target block.

In the following two steps, the decision unit 130 decides, in accordance with the procedures shown in step S202 of FIG. 4, usability of the prediction information associated with the neighbouring block on the first side, such as on the left and usability of the prediction information associated with the neighbouring block on the second side, such as the top, and outputs a decision result.

Next, in step S802, the region width decoder 218 decides, based on the decision result of the decision unit 130, whether the prediction information associated with either one of the two or more neighbouring blocks is usable or not. When the prediction information associated with any of the neighbouring blocks is unusable, the region width decoder 218 sets, in step S804, the region width of the partition R2 in the decoding target block to a predetermined value, such as zero, and ends the process.

On the other hand, in step S802, when it is decided that the prediction information associated with either one of the at least two neighbouring blocks is usable, the region width decoder 218 decides, based on the decision result of the decision unit 130, in the following step S806, whether the prediction information associated with each of the two or more neighbouring blocks are usable or not. When the prediction information of the two or more neighbouring blocks are usable, the region width decoder 218 decodes, in the following step S808, identification information to identify at least one of the neighbouring blocks from the encoded data and proceeds to step S812.

On the other hand, in step S806, when it is decided that the prediction information associated with any of the two or more neighbouring blocks is usable, the region width decoder 218 selects, based on the decision result of the decision unit 130, in the following step S810, the prediction information associated with any of the two or more neighbouring blocks determined to be useable and proceeds to step S812. In step S812, the region width decoder 218 decodes a value of the region width.

Figure 13:
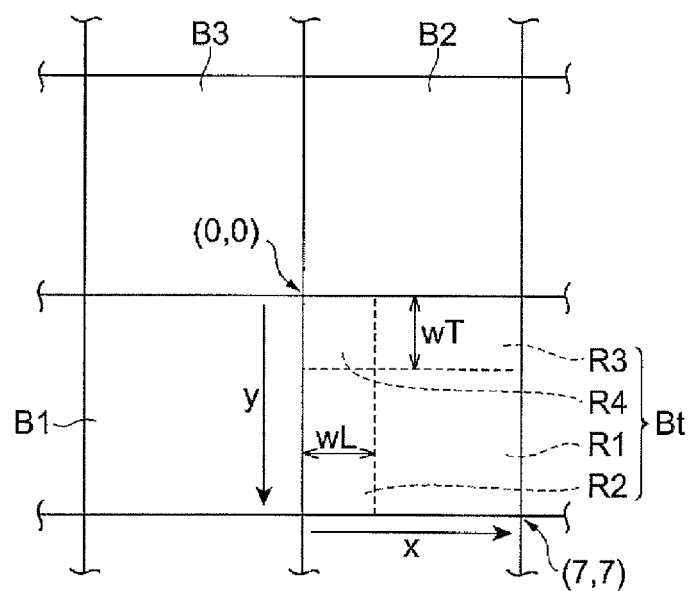
FIG. 13 is a diagram illustrating another example of the partition in the target block where the prediction signal is produced by using the prediction information of the neighbouring block.

The prediction signal may be produced by using at least the prediction information associated with the neighbouring block on the first side, such as on the left of the target block and the prediction information associated with the neighbouring block on the second side, such as on the top. In that case, the region width encoder 136 has a function of encoding both groups of the at least two pieces of prediction information associated with the at least two neighbouring blocks and at least two region widths, while the region width decoder 218 has a function of decoding groups of the two or more pieces of prediction information and the two or more region widths. In addition, in that case, as shown in FIG. 13, prediction signals of four partitions R1 to R4 in the target block Bt are produced individually. In other examples, any number of partitions may be used.

Accordingly, the prediction signal generator 106 produces the prediction signal of the partition R2 by using the prediction information associated with the neighbouring block B1 on the first side, such as on the left, and produces the prediction signal of the partition R3 by using the prediction information associated with the neighbouring block B2 on the second side, such as on the top. In addition, the prediction signal generator 106 may have a function of producing the prediction signal of the partition R4. The method for predicting the partition R4, which may be given as a rule in advance, is not limited in the image predictor encoding/decoding system. Examples of the method include a method for averaging the prediction signal of the partition R4 that is produced based on the prediction information associated with the neighbouring block on the first side, such as the left, and the prediction signal of the partition R4 that is produced based on the prediction information associated with the neighbouring block on the second side, such as the top, with respect to a pixel unit; and a method for producing the prediction signal of the partition R4 based on the prediction information associated with the neighbouring block on the side, such as the top-left. In addition, there may be adopted a method in which selection is automatically made, by using surrounding already decoded data including the prediction information associated with the neighbouring blocks on the first side, such as the left and on the second side, such as the top, from the prediction information that belong to the neighbouring blocks on the first side and on the second side; or a method of transmitting selection information.

Furthermore, the following modifications can be made in the image predictor encoding/decoding system.

(Block Shape)

Figure 14A:
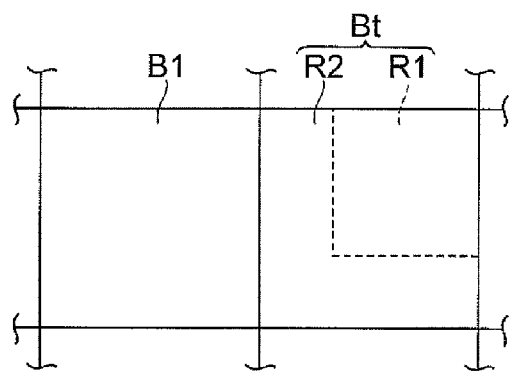
FIGS. 14A and 14B are diagrams showing another example of the partition.
Figure 14B:
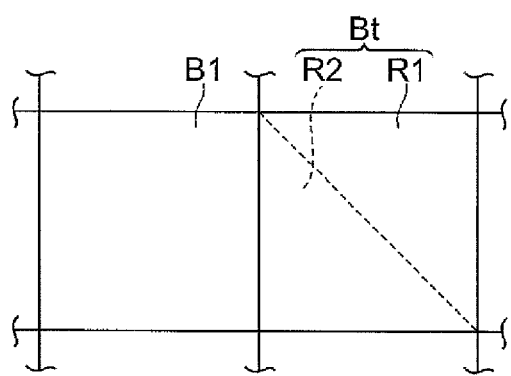

In the description above, the partition of the target block is illustrated as rectangular, but as shown in the partitions R1 and R2 of the target block Bt in FIG. 14A, or as shown in the partitions R1 and R2 of the target block Bt in FIG. 14B, the partition in any shape may be used. In such case, shape information is transmitted in addition to a region width.

(Block Size)

Figure 15A:
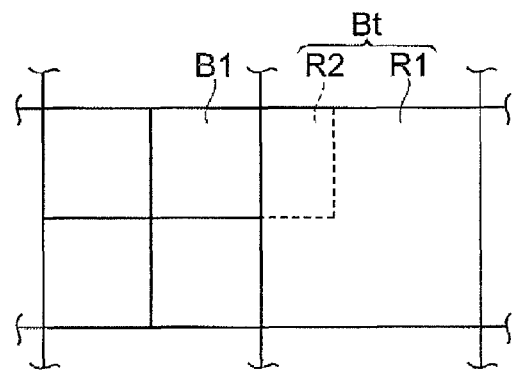
FIGS. 15A through 15C are diagrams showing other examples of the target block and the neighbouring block.
Figure 15B:
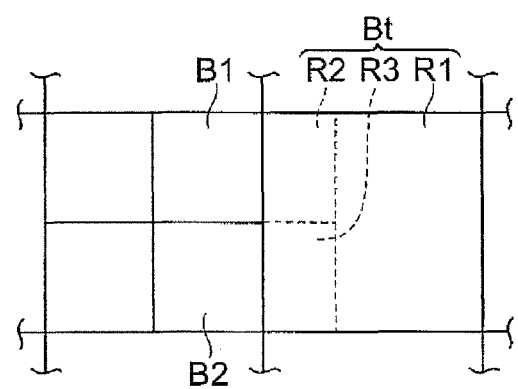
Figure 15C:
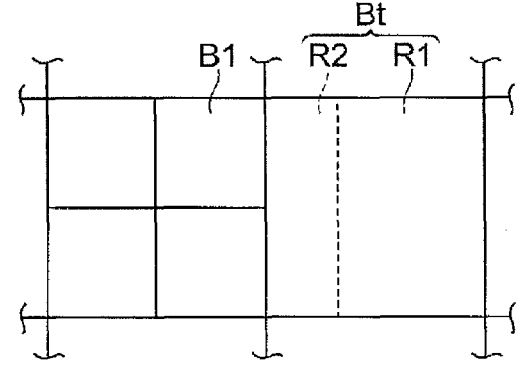

In the description above, the block size is a fixed size, but as shown in A-C of FIG. 15, the target block Bt and the neighbouring block B1 may differ in size. In such case, as shown in A-C of FIG. 15, various shapes can be used as the shape of the partitions R1 to R3 in the target block Bt. The partitions to be constituted may be determined according to circumstances, or the information indicating the neighbouring block may be selected from a plurality of candidates and may be explicitly encoded. In addition or alternatively, a predetermined rule may be provided in advance (for example, a unit for selecting the region width is aligned with the smaller one in block size).

(Region Width Encoder and Decoder)

In the region width encoder, not a region width value itself, but information identifying the region width may be encoded. In addition, in the region width decoder, not the region width value itself, but the information identifying the region width may be decoded from the encoded data, and the region width value may be restored, based on the information identifying the region width. For example, the region width encoder prepares a plurality of candidates for the region width values of the partition in the target block and may encode the identification information of the selected candidate. The region width decoder may restore the region width value based on the decoded identification information. The candidates for the region widths may be determined in advance by the encoder and the decoder, or may be transmitted for each sequence unit or for each frame unit. In addition, the region width encoder may encode a differential value between the region width value of the partition in the target block and the region width of the neighbouring block. In such case, the region width decoder can restore the region width value of the partition in the target block by adding the already decoded region width value of the neighbouring block to the differential value decoded from the encoded data. Alternatively, the region width encoder may encode information indicating that the region width of the partition in the target block is the same as, matches, and/or is substantially similar to, the region width of the neighbouring block. When the information indicating that the region width of the partition in the target block is similar to the region width of the neighbouring block, is decoded, the region width decoder can use the region width of the neighbouring block as the region width of the partition in the target block. In this case, information indicating that the region width of the partition in the target block is different from the region width of the neighbouring block, as well as, information identifying the region width value or the region width, may be transmitted. When the information indicating that the region width of the partition in the target block is different from the region width of the neighbouring block, is decoded, the region width decoder further decodes the information identifying the region width value or the region width from the encoded data and may restore the region width value, based on the information identifying the region width. In addition, the region width encoder may encode one or more information items for identifying the region width. That is, one or more information items that are capable of uniquely identifying the region width (for example, one or more bits) may be encoded. In such case, the region width decoder decodes one or more information items from the encoded data and can restore the region width, in accordance with the one or more information items.

(Transformer, Inverse-Transformer)

A transform process of the residual signal may be performed in a fixed block size. The target region may be further divided into a size that matches with the partition, and with respect to each region produced by the further division, the transform process may be performed.

(Decision Unit)

The neighbouring block, of which prediction information associated with the neighbouring block can be used, is not limited to the neighbouring block on a first side, such as the top of the target block and the neighbouring block on a second side, such as on the left of the target block. For example, when the prediction information is encoded beforehand by one block line, all blocks located adjacent to the target block, such as four blocks, can be the neighbouring block, and the pieces of prediction information associated therewith can be used to produce the prediction signal of the target block.

In addition, when the pieces of prediction information of all blocks in a picture is encoded beforehand, the prediction signal of each target block can be freely constituted by using a total of a predetermined number of pieces of prediction information associated with neighbouring blocks surround the target block, such as five (or nine, when including left-top, left-bottom, right-top and right-bottom) pieces of prediction information associated with surrounding four blocks and the target block.

Furthermore, even if the partition is provided when the target block and the neighbouring block have the same, matching, or substantially similar prediction information, the encoding and decoding processing may not fail, so that a prediction signal production process of the image predictor encoding/decoding system can be realized when a decision unit is omitted.

(About Decision of Decision Unit)

In the description above, according to the predetermined rule for the decision unit 130 to decide usability of the prediction information associated with the neighbouring block, it is decided that the prediction information associated with the neighbouring block is not to be used, when the prediction information associated with the neighbouring block coincides with the prediction information associated with the target block, or when it is decided that the prediction information of the neighbouring block is in a unusable state. In the latter case, when the neighbouring block is predicted by intra-picture prediction and the target block is predicted by inter-picture prediction, and in the opposite case; it may be decided that the prediction information associated with the neighbouring block is not to be used. In addition, when a difference between a motion vector of the neighbouring block and a motion vector of the target block exceeds a threshold value, it may be decided that the prediction information associated with the neighbouring block is not to be used. Furthermore, when the block sizes of the neighbouring block and the target block are different from each other, it may be decided that the prediction information associated with the neighbouring block is not to be used. In the description above, the prediction information associated with the neighbouring block and the target block are compared, but based on whether the prediction signals produced with the at least two pieces of prediction information are matching or not, usability of the prediction information associated with the neighbouring block may be decided.

(Prediction Information)

In the description above, the inter-picture prediction (motion vector and reference picture information) is described as a method for producing the prediction signal, but the image predictor encoding/decoding system is not limited to such prediction method. The prediction method including the intra-picture prediction, luminance compensation, bidirectional prediction, or backward prediction, may be applied to the prediction signal production process of the image predictor encoding/decoding system. In such case, mode information, a luminance compensation parameter and the like are included in the prediction information.

(Color Signal)

In the description above, a color format is not particularly mentioned, but as to a color signal or a color-difference signal, a production process of the prediction signal may be performed separately from a luminance signal. In addition, the production process of the prediction signal of the color signal or the color-difference signal may be performed in conjunction with the process of the luminance signal. In the latter case, when a resolution of the color signal is lower than the luminance signal (for example, the resolution is half in a horizontal direction and in a vertical direction), the region width in the luminance signal may be controlled (for example, to even values), or a transformation equation from the region width of the luminance signal to the region width of the color signal may be determined.

(Block Denoising Processing)

It is not mentioned above, but, when a block denoising process is performed with respect to a reconstructed image, a denoising process may be performed with respect to a boundary part of the partition of the target region.

The image predictor encoding/decoding system may include an image predictive encoding program enabling a computer to operate as the image predictive encoding device 100, and an image predictive decoding program enabling a computer to operate as the image predictive decoding device 200 are described below.

Figure 16:
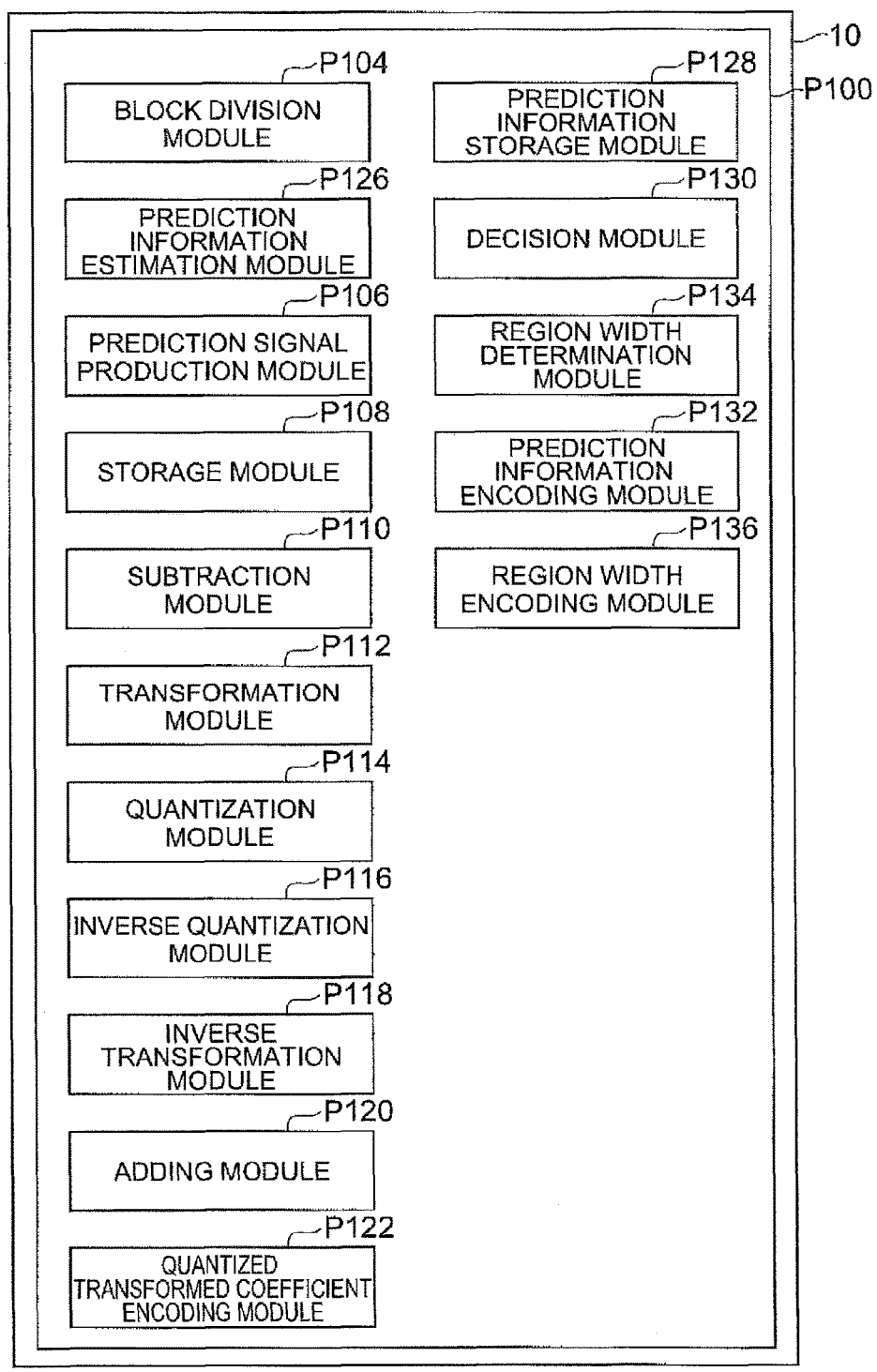
FIG. 16 is a diagram showing an image predictive encoding program according to one embodiment.
Figure 17:
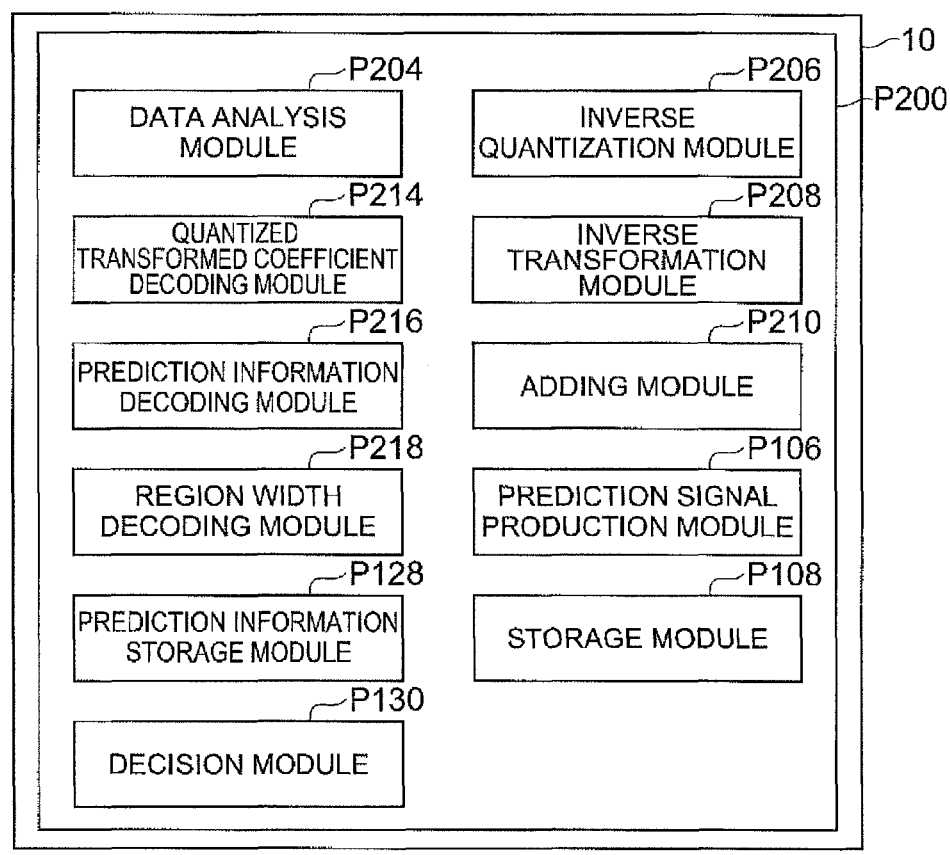
FIG. 17 is a diagram showing an image predictive decoding program according to one embodiment.
Figure 18:
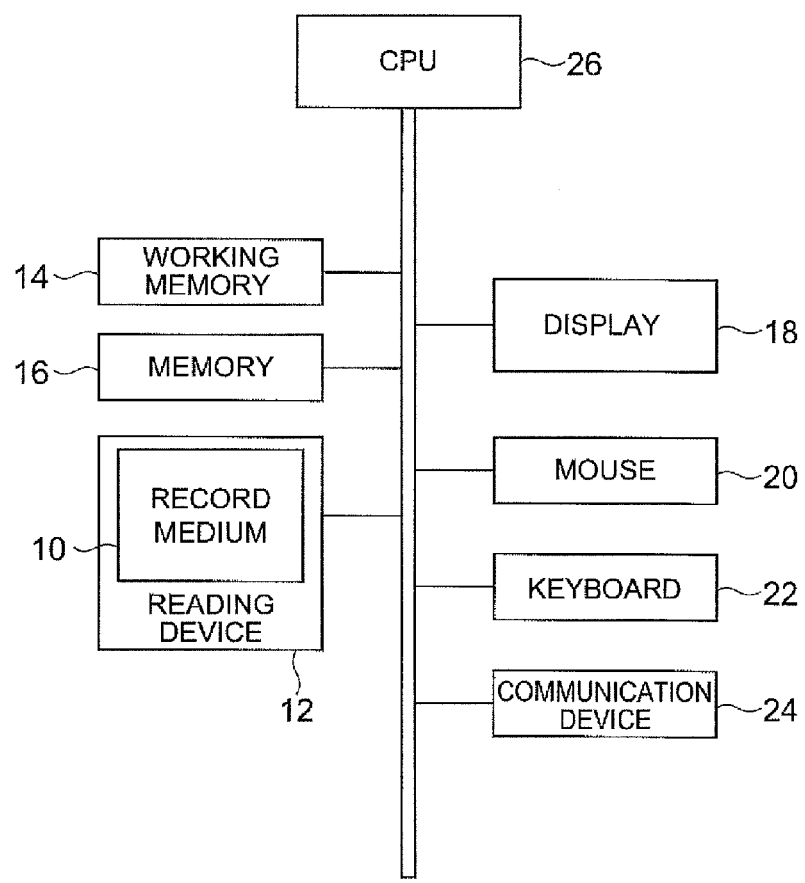
FIG. 18 is a diagram showing an example hardware structure of a computer for executing a program stored in a record medium.
Figure 19:
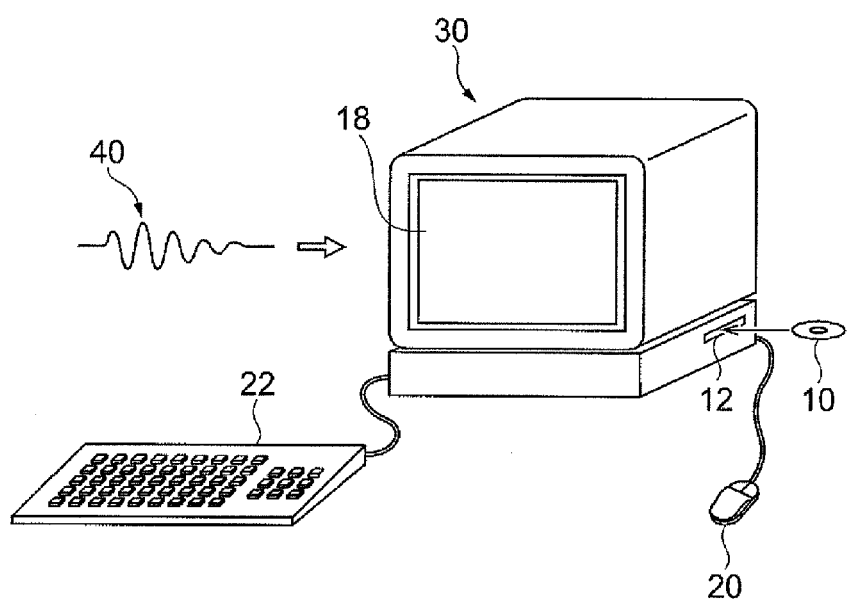
FIG. 19 is a perspective view of the computer for executing the program stored in the record medium.

FIG. 16 is a diagram showing an example of at least part of image predictor encoding/decoding system that includes an image predictive encoding program as well as a non-transitory recordable medium according to one embodiment. FIG. 17 shows an image predictive decoding program as well as a recording medium according to one embodiment. FIG. 18 is a diagram showing an example hardware configuration of a computer for executing a program recorded in the recording medium. FIG. 19 is a perspective view of the example computer for executing the program stored in the record medium.

As shown in the example of FIG. 16, an image predictive encoding program P100 is provided by being stored in a non-transitory record medium 10, computer readable medium and/or memory. As shown in FIG. 17, an image predictive decoding program P200 is also provided by being stored in the non-transitory recording medium 10, computer readable medium and/or memory. Instructions in the form of computer software, firmware, data or any other form of computer code and/or computer program readable by a computer within the image predictor encoding/decoding system may be stored in the non-transitory recording medium. Examples of the recording medium 10 include recording media, such as floppy disks, CD-ROMs, DVDs, and ROMs; and semiconductor memories.

As shown in FIG. 18, an example computer 30 is provided with a reading device 12 such as a floppy disk drive, a CD-ROM drive device, and a DVD drive device; a working memory (RAM) 14 including a resident operating system; a memory 16 that stores a program stored in the record medium 10; a display device 18 such as a display; a mouse 20 and a keyboard 22 both of which are input devices; a communication device 24 that transmits and receives data and the like; and a CPU 26, or processor, that controls the execution of the program. In one example, upon insertion of the recording medium 10 into the reading device 12, the computer 30 becomes accessible to the image predictive encoding program P100 at least partly stored in the record medium 10 from the reading device 12, and is enabled by the program P100 to operate as the image predictive encoding device 100. In addition, upon the insertion of the recording medium 10 into the reading device 12, the computer 30 becomes accessible to the image predictive decoding program P200 at least partly stored in the recording medium 10 from the reading out device 12, and is enabled by the program P200 to operate as the image predictive decoding device 200.

As shown in FIG. 19, the image predictive encoding program P100 and the image predictive decoding program P200 may be provided through a network as a computer data signal 40 superimposed on a carrier wave. In such case, the computer 30 stores in the memory 16 at least part of the image predictive encoding program P100 or the image predictive decoding program P200 that is received by the communication device 24, and can execute the program P100 or P200.

As shown in FIG. 16, the image predictive encoding program P100 may include at least part of a block division module P104, a prediction signal production module P106, a storage module P108, a subtraction module P110, a transformation module P112, a quantization module P114, an inverse quantization module P116, an inverse transformation module P118, an adding module P120, and a quantized transformed coefficient encoding module P122, a prediction information estimation module P126, a prediction information storage module P128, a decision module P130, a region width determination module P134, a prediction information encoding module P132, a region width determination module P134, and a region width encoding module P136.

Functions realized by executing each module described above are the same, or substantially similar, as the functions of the image predictive encoding device 100 described above. That is, the functions of each module of the image predictive encoding program P100 are the same, or substantially similar as the functions of the block division unit 104, the prediction signal generator 106, the frame memory 108, the subtractor 110, the transformer 112, the quantizer 114, the inverse quantizer 116, the inverse transformer 118, the adder 120, the quantized transformed coefficient encoder 122, the prediction information estimator 126, the prediction information memory 128, the decision unit 130, the prediction information encoder 132, the region width determiner 134, and the region width encoder 136.

The image predictive decoding program P200 may include at least part of a data analysis module P204, a quantized transformed coefficient decoding module P214, a prediction information decoding module P216, a region width decoding module P218, the prediction information storage module P128, the decision module P130, an inverse quantization module P206, an inverse transformation module P208, an adding module P210, the prediction signal production module P106, and the storage module P108.

Functions realized by executing each module described above are the same, or substantially similar as those of each component of the image predictive decoding device 200. That is, the functions of each module of the image predictive decoding program P200 are the same, or substantially similar as the functions of the data analyzer 204, the quantized transformed coefficient decoder 214, the prediction information decoder 216, the region width decoder 218, the prediction information memory 128, the decision unit 130, the inverse quantizer 206, the inverse transformer 208, the adder 210, the prediction signal generator 106, and the frame memory 108.

As described above, the image predictor encoding/decoding system has been described in detail based on the example embodiments. The present invention, however, is not limited to the above-described example embodiments. Various modifications can be made without departing from the scope of the invention. It will be apparent to those of ordinary skill in the art that many more examples and implementations are possible within the scope of the invention. Accordingly, the invention is not to be restricted except in light of the attached claims and their equivalents.

What is claimed is:

1. An image predictive decoder comprising a memory that stores a program executable by the image predictive decoder to:
   extract, from compressed data in which an image is divided into a plurality of regions and encoded, encoded data of identification information that specifies an identification of a region that is not agreed upon to use in advance between an image predictive encoder and the image predictive decoder and is used to produce a prediction signal of a target region, and encoded data of a residual signal;
   read out the identification specified in the identification information;
   prepare a list that consists of entries corresponding, respectively, to a plurality of neighbouring regions that neighbour the target region;
   select a neighbouring region from the list, the selected neighbouring region being identified by the identification specified in the identification information;
   produce the prediction signal of the target region by using prediction information for the specified neighbouring region comprising (i) mode information that specifies an inter-picture prediction method, (ii) a reference picture number, and (iii) a motion vector, all of which are used for prediction of the specified neighbouring region;
   restore a reproduction residual signal of the target region from the encoded data of the residual signal;
   produce a reproduction signal of the target region based on the prediction signal of the target region and the reproduction residual signal; and
   store the reproduction signal of the target region as the reconstructed signal in the memory.

2. An image predictive decoding method comprising:
   a data extraction step for extracting, from compressed data in which an image is divided into a plurality of regions and encoded, encoded data of identification information that specifies an identification of a region that is not agreed upon to use in advance between an encoder and a decoder and is used to produce a prediction signal of a target region, and encoded data of a residual signal;
   an identification information reading out step for reading out the identification specified in the identification information;
   a list preparing step for preparing a list that consists of entries corresponding, respectively, to a plurality of neighbouring regions that neighbour the target region
   a neighbouring region selecting step for selecting a neighbouring region from the list the selected neighbouring regions being identified by the identification specified by the identification information decoded from encoded data of the identification information to produce;
   a prediction signal production step for producing a prediction signal of the target region by using prediction information for the specified neighboring region comprising (i) mode information that specifies an inter-picture prediction method, (ii) a reference picture number, and (iii) a motion vector, all of which are used for prediction of the specified neighbouring region;

a residual signal restoration step for restoring a reproduction residual signal of the target region from the encoded data of the residual signal;

a signal production step for producing the reproduction signal of the target region based on the prediction signal of the target region and the reproduction residual signal; and a storage step for storing the reproduction signal of the target region as the reconstructed signal.

3. The image predictive decoder according to claim 1, wherein the memory further stores a program executable by the image predictive decoder to:

extract encoded data of partition information;

decode the encoded data of the partition information to restore the partition information;

decode the encoded data of the identification information to restore the identification information; and when the partition information specifies that the target region is divided into a first partition and a second partition, produce a prediction signal of the first partition of the target region by using the prediction information for the specified neighbouring region.

4. The image predictive decoder according to claim 3, wherein the identification information specifies an identification of a neighbouring region from among the plurality of neighbouring regions excluding a neighbouring region predicted by intra-picture prediction.

5. The image predictive decoding method according to claim 2 further comprising:

a step for extracting encoded data of partition information;

a step for decoding the encoded data of the partition information to restore the partition information;

a step for decoding the encoded data of the identification information to restore the identification information; and when the partition information specifies that the target region is divided into a first partition and a second partition, a step for producing a prediction signal of the first partition of the target region by using the prediction information for the specified neighbouring region.

6. The image predictive decoding method according to claim 5, wherein the identification information specifies an identification of a neighbouring region from among the plurality of neighbouring regions excluding a neighbouring region predicted by intra-picture prediction.

* * * * *